United States Patent
Dortmund et al.

(10) Patent No.: US 9,621,307 B2
(45) Date of Patent: Apr. 11, 2017

(54) METHOD FOR TRANSMITTING A PLURALITY OF UPLINK MESSAGES AND MOBILE RADIO COMMUNICATION TERMINAL DEVICE

(71) Applicant: Intel IP Corporation, Santa Clara, CA (US)

(72) Inventors: Sven Dortmund, Bochum (DE); Matthias Hofmann, Freital (DE); Sabine Roessel, Munich (DE); Robert Zaus, Munich (DE)

(73) Assignee: INTEL IP CORPORATION, Santa Clara, CA (US)

( * ) Notice: Subject to any disclaimer, the term of this patent is extended or adjusted under 35 U.S.C. 154(b) by 75 days.

(21) Appl. No.: 14/670,519

(22) Filed: Mar. 27, 2015

(65) Prior Publication Data
US 2016/0285591 A1 Sep. 29, 2016

(51) Int. Cl.
*H03M 13/00* (2006.01)
*H04L 1/20* (2006.01)
*H04L 1/18* (2006.01)

(52) U.S. Cl.
CPC .............. *H04L 1/20* (2013.01); *H04L 1/1877* (2013.01); *H04L 1/1812* (2013.01); *H04L 1/1854* (2013.01)

(58) Field of Classification Search
CPC ................................ H04L 1/08; H04L 1/1812
See application file for complete search history.

(56) References Cited

U.S. PATENT DOCUMENTS

| | | | |
|---|---|---|---|
| 2004/0224697 A1* | 11/2004 | Hakkinen | H04L 1/0081 455/450 |
| 2011/0179329 A1 | 7/2011 | Kim et al. | |
| 2011/0242990 A1* | 10/2011 | Simonsson | H04W 72/085 370/242 |
| 2012/0257559 A1* | 10/2012 | Kim | H04L 5/001 370/311 |
| 2016/0233999 A1* | 8/2016 | Chendamarai Kannan | H04L 5/0055 |

* cited by examiner

*Primary Examiner* — Sam Rizk
(74) *Attorney, Agent, or Firm* — Viering, Jentschura & Partner mbB

(57) ABSTRACT

A method for transmitting a plurality of uplink messages may include transmitting a first uplink message to a sink device and monitoring a feedback channel for feedback information from the sink device during one or more default feedback reception periods associated with the first uplink message. The method may further include skipping monitoring of the feedback channel during the remaining default feedback reception periods associated with the first uplink message if a number of consecutive default feedback reception periods containing positive feedback information exceeds a threshold, updating the threshold based on a channel quality measure, transmitting a second uplink message, and monitoring or skipping monitoring of the feedback channel during default feedback reception periods associated with a second uplink message based on the updated threshold.

20 Claims, 8 Drawing Sheets

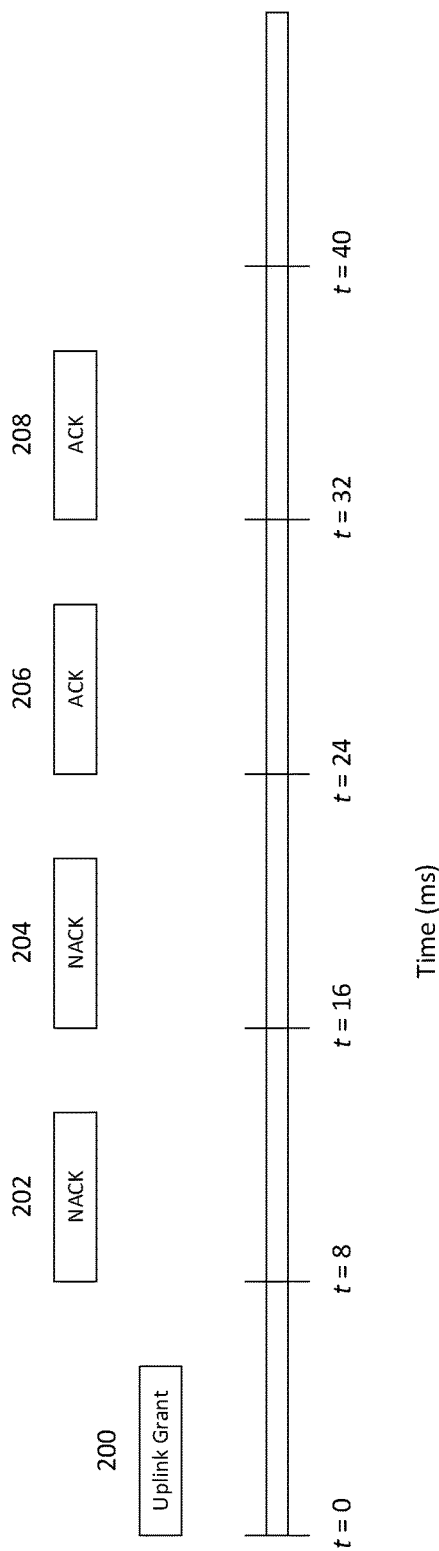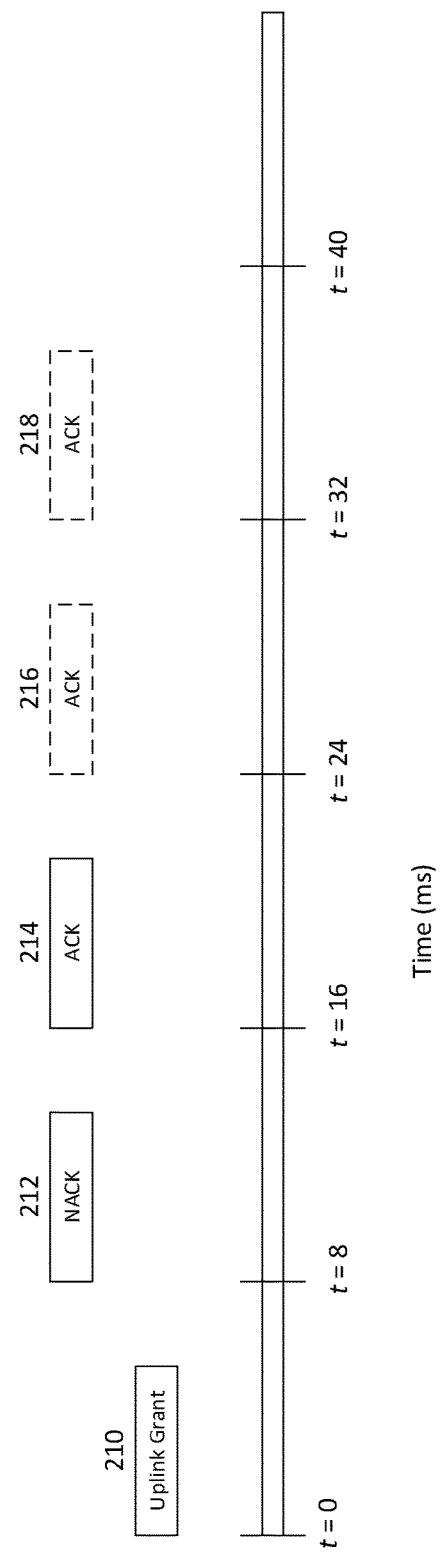

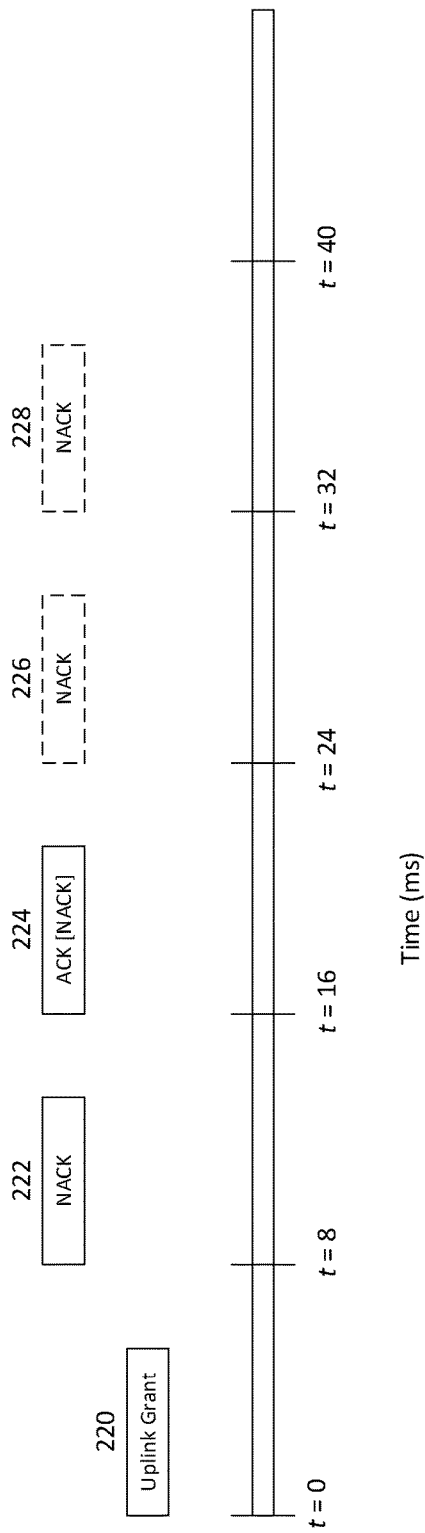
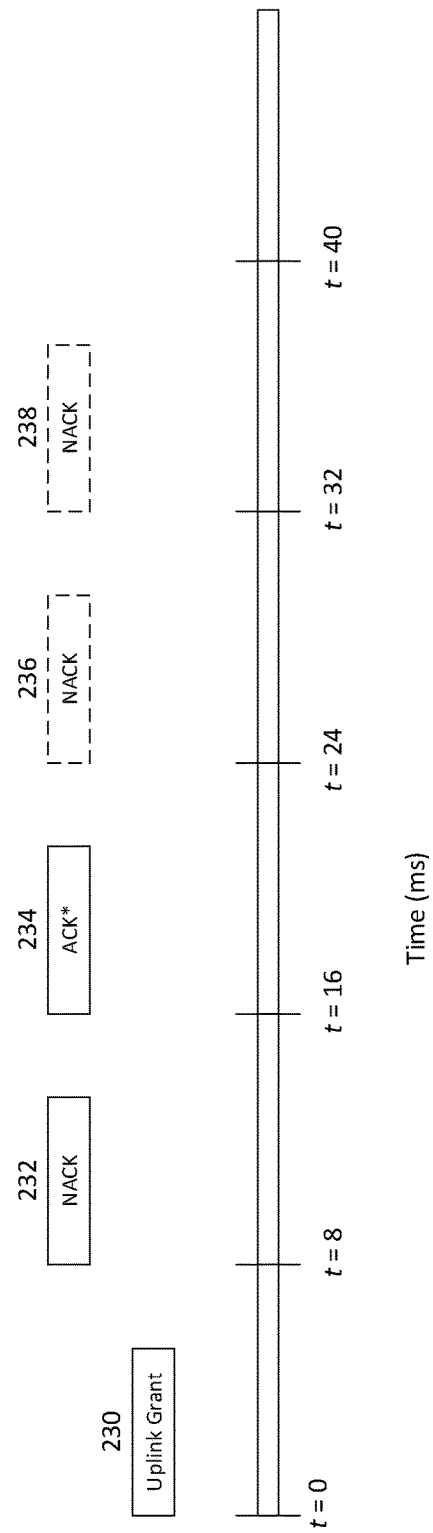

METHOD FOR TRANSMITTING A PLURALITY OF UPLINK MESSAGES AND MOBILE RADIO COMMUNICATION TERMINAL DEVICE

TECHNICAL FIELD

Various embodiments relate generally to a method for transmitting a plurality of uplink messages and to a mobile radio communication terminal device.

BACKGROUND

Discontinuous reception (DRX) mode may be provided in mobile terminals in order to reduce power usage in both idle and connected mode, such as e.g. by allowing the mobile terminal to periodically disable the receiver and entering a power saving mode. However, in certain scenarios the network may require a mobile terminal to extend the "onTime" of the UE in Connected-DRX (C-DRX) mode, i.e. the time period in which the receiver of the UE must be active in order to receive transmission from a base station. In particular, the receiver must remain active during an uplink (UL) Hybrid Automatic Repeat Request (HARQ) process, during which a UE transmits an message to a base station and attempts to receive any subsequent retransmission requests. As specified by the $3^{rd}$ Generation Partnership Project (3GPP) standard, the onTime may extended in an uplink HARQ process when the HARQ transmission buffer (i.e. the buffer containing uplink data to be transmitted) is not empty and there is a possibility to receive a retransmission grant from a serving base station.

The serving base station may send such a retransmission grant in the event that the reception of an uplink data message from a mobile terminal was unsuccessful. The serving base station may request retransmission of the uplink data message from the mobile terminal by transmitting the retransmission grant, to which the mobile terminal may respond by retransmitting the uplink data message (i.e. as stored in the HARQ transmission buffer).

The serving base station may transmit retransmission requests according to a periodic schedule following the initial uplink grant (i.e. the grant from the serving base station initially instructing the mobile terminal to send the data message), such as e.g. every 8 ms following the initial uplink grant. Accordingly, the mobile terminal may be configured to monitor for retransmission grants at times t=8, 16, 24, . . . ms following reception of an initial uplink grant at time t=0. Each of the time periods corresponding to t=8, 16, 24, . . . ms when a retransmission grant may be received by the mobile terminal may thus be referred to as a retransmission grant occasion.

The mobile terminal may thus be required to listen during each retransmission grant occasion for potential retransmission grants, regardless if an acknowledgement (ACK) message indicating successful receipt of the uplink data message is received. In other words, even if the serving base station indicated through HARQ feedback (i.e. by transmitting an ACK) that the uplink data message was successfully received, the mobile terminal may still be required to listen for retransmission grants during one or more subsequent retransmission grant occasions.

The network may define a maximum number of total HARQ transmissions including the initial uplink grant and any remaining retransmissions with the parameter maxHARQ_tx. As maxHARQ_tx defines the total number of HARQ transmissions including the initial uplink grant, a total of maxHARQ_tx−1 retransmission grant occasions may occur following the initial uplink grant. The mobile terminal may thus be required to listen every 8 ms for potential retransmission requests during each of the maxHARQ_tx−1 retransmission grant occasions. As each of these grants requires reception of a message by the mobile terminal, the receiver will need to be active. Consequently, the mobile terminal may not be able to enter a low power state during the retransmission grant occasions.

The 3GPP standard has defined the default value of maxHARQ_tx as 5, and accordingly a mobile terminal is required to listen during the 4 retransmission grant occasions (i.e. maxHARQ_tx−1 retransmission grant occasions) following reception of an initial uplink grant. Accordingly, a mobile terminal operating according to maxHARQ_tx=5 must listen for potential retransmission grants at t=[8, 16, 24, 32] ms. Furthermore, the standard dictates that the mobile terminal must monitor for retransmission grants during every retransmission grant, regardless if an ACK message is received. For example, a mobile terminal may receive an ACK message at t=8 ms following an initial uplink transmission, indicating that the serving base station has successfully received the initial uplink transmission and does not require any retransmissions. However, the mobile terminal is still required by the 3GPP standard to listen at t=[16, 24, 32] ms. Accordingly, onTime for the mobile terminal is significantly increased during an uplink HARQ process. Use of power saving options such as power/clock gating of temporarily not required modem subcomponents may not be possible.

In addition to a default value of maxHARQ_tx=5, maxHARQ_tx may be set by the network by Radio Resource Control (RRC) signaling, and may be e.g. set to any value out of the set {1, 2, 3, 4, 5, 6, 7, 8, 10, 12, 16, 20, 24, 28}. While any of these values are possible, it is common practice to use the default value of 5. Additionally, the default value of maxHARQ_tx=5 will be assumed if no value for maxHARQ_tx is directly specified by the network.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIGS. 2A-2D show timing diagrams illustrating exemplary HARQ transmission cycles;

DESCRIPTION

Figure 1:
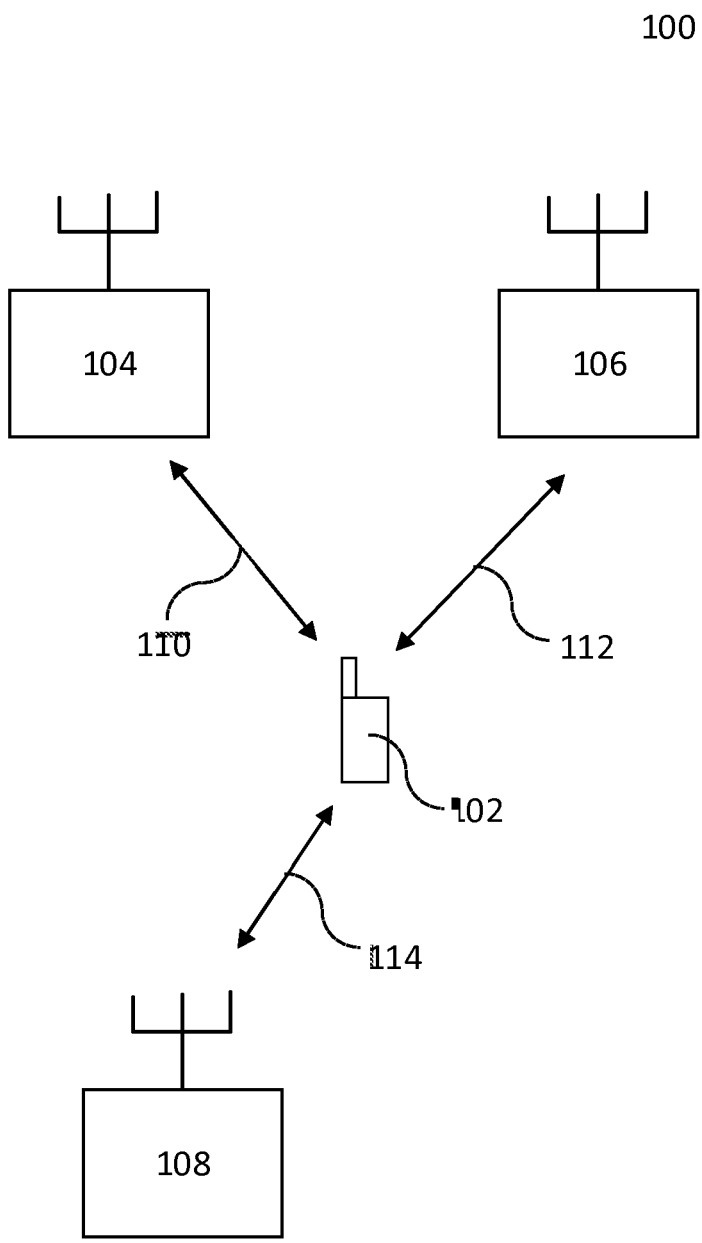
FIG. 1 shows a mobile radio communication system.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

As used herein, a "circuit" may be understood as any kind of a logic implementing entity, which may be special purpose circuitry or a processor executing software stored in a memory, firmware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It may also be understood that any two (or more) of the described circuits may be combined into one circuit.

As used herein, a "cell" in the context of telecommunications may be understood as a sector served by a base station. A base station may thus serve one or more "cells" (or sectors), where each cell includes at least one unique communication channel. An "inter-cell handover" may thus be understood as handover from a first "cell" to a second "cell", where the first "cell" is different than the second "cell". "Inter-cell handovers" may be characterized as either "inter-base station handovers" or "intra-base station handovers". "Inter-base station handovers" may be understood as handover from a first "cell" to a second "cell", where the first "cell" is provided at a first base station and the second "cell" is provided at a second, different base station. "Intra-base station handovers" may be understood as a handover from a first "cell" to a second "cell", where the first "cell" is provided at the same base station as the second "cell". A "serving cell" may be understood as a "cell" which a mobile terminal is currently connected to according to the mobile communication protocols of the associated mobile communication network standard.

The requirement for a mobile terminal executing an uplink HARQ process to monitor a feedback channel during retransmission grant occasions may prevent the mobile terminal from conserving battery power, such as e.g. by entering a low power state. The power usage for mobile terminals executing such HARQ processes may be unnecessarily high, as it may not be necessary to listen to every retransmission grant occasion. As opposed to listening to every retransmission grant occasion, it may be desirable to only listen a certain number of retransmission grant occasions following reception of an ACK from a base station, and to stop monitoring if the base station provides further ACK messages during these retransmission grant occasions. For example, it may be beneficial to monitor only k subsequent uplink retransmission grant occasions after an ACK is received, such as e.g. with k=0 or 1, and to skip monitoring during any remaining retransmission grant occasions the current HARQ cycle (i.e. spanning from the initial uplink grant until the final retransmission grant occasion defined by maxHARQ_tx) if only non-NACK messages are received at the k retransmission grant occasions immediately following reception of the first ACK. Such an approach may dramatically reduce onTime by 8-24 ms depending on maxHARQ_tx settings of maxHARQ_tx=4 or maxHARQ_tx=5.

A mobile terminal may skip monitoring of a retransmission grant during the remaining uplink retransmission grant occasions following reception of an one or more consecutive ACK messages, thereby relieving the broadband and radio frequency engine from Physical Downlink Control Channel (PDCCH) monitoring. Power saving features such as power/clock gating of temporarily not required modem subcomponents may thus be activated during the remaining skipped retransmission grant occasions, resulting in battery conservation.

The mobile terminal may thus operate as a HARQ source while the serving base station may operate as a HARQ sink in an uplink HARQ process. In other words, the mobile terminal may act as the origin of the uplink data, while the serving base station that the mobile terminal is connected to may act as the destination for the uplink data. As opposed to Automatic Repeat Request (ARQ), which utilizes only backward error correction, HARQ utilizes both forward and backward error correction in order to successfully transmit data. A HARQ sink (e.g. the serving base station) evaluates messages from a HARQ source (e.g. the mobile terminal) using an error detecting code (such as e.g. Cyclic Redundancy Check (CRC)) in order to evaluate the level of corruption in the received message. If many errors are present (i.e. channel quality is poor), the HARQ sink may request retransmission of the message in the form of a retransmission grant to the HARQ source, and the HARQ source may subsequently retransmit the message. Alternatively, the HARQ sink may determine that the number of errors is low, thereby indicating that the errors may be correctable using forward error correction. The HARQ sink may then decode the data using forward error correction instead of requesting a retransmission from the HARQ source.

If radio conditions are substantially poor, a HARQ sink may need to request multiple consecutive retransmissions from the HARQ source in order to successfully receive the message. For example, the HARQ sink may receive an initial transmission of a message and determine (e.g. using an error detection code such as CRC) that the message is substantially corrupted. The HARQ sink may then transmit a retransmission grant to the HARQ source, thereby requesting another transmission. The HARQ source may then retransmit the same message, which the HARQ sink may subsequently perform error detection on upon reception. The HARQ sink may again determine that the message is substantially corrupted, and may again request retransmission of the message. The HARQ sink may thus request multiple retransmissions of a message by transmitting subsequent retransmission grants to the HARQ source.

This process may repeat until the HARQ sink receives the message at sufficient quality or until a maximum number of retransmission grant occasions have completed (i.e. the HARQ retransmission cycle is complete). The maximum number of retransmission occasions in a single HARQ retransmission cycle is dictated by the parameter maxHARQ_tx, which may be defined by the network as previously detailed. The parameter maxHARQ_tx may define the total number of allowed HARQ transmissions including both the initial HARQ transmission and any subsequent retransmissions. For example, the default setting of maxHARQ_tx=5 dictates that an initial HARQ transmission (i.e. the initial message from the HARQ source to the HARQ sink) followed by up to 4 (i.e. maxHARQ_tx−1) HARQ retransmissions (i.e. retransmissions from the HARQ source to the HARQ sink) are permitted.

After receiving a message from a HARQ source, a HARQ sink may send either an acknowledgement (ACK) or non-acknowledgement (NACK) in response. For example, the HARQ sink may transmit an ACK if the message was properly decoded, e.g. the error detection processing indicated that the message was of sufficient quality. Alternatively, the HARQ sink may transmit a NACK if the message was not decoded successfully. NACK messages received by the HARQ source may thus be retransmission grants, and may instruct the HARQ source to retransmit the message. The HARQ source will thus either perform a retransmission (upon receiving a retransmission grant in the form of a NACK) or not perform any transmission (upon receiving an ACK) in direct response to HARQ sink feedback.

The HARQ procedure may be implemented as a stop-and-wait protocol, where both transmissions of ACKs, NACKs, and HARQ messages occur according to a predefined periodic schedule, such as e.g. according to 8 ms intervals. In other words, the HARQ sink may transmit an uplink grant (i.e. initial transmission request), which may be received by the HARQ source at t=0 ms. The HARQ sink may be further configured to only send ACK/NACK messages every 8 ms following transmission of the uplink grant. The HARQ source may thus receive ACK/NACK messages at t=8, 16, . . . , (maxHARQ_tx−1)*8 ms. The HARQ source may thus be required to monitor for an ACK/NACK from the HARQ sink every 8 ms following reception of the initial transmission request from the HARQ sink at t=0, i.e. at t=8, 16, . . . , (maxHARQ_tx−1)*8 ms. Accordingly, the HARQ source may need to continuously monitor for maxHARQ_tx−1 retransmission grants from the HARQ sink. The time durations defined by t=8, 16, . . . , (maxHARQ_tx−1)*8 ms may thus be referred to as retransmission grant occasions, and represent possible time periods during which retransmission grants may be received (in addition to ACKs, which may not require any immediate action by the transmitter).

As previously detailed, the reception of an ACK by the HARQ source from the HARQ sink may potentially indicate that the message was successfully received, and the HARQ source may not be required to take any immediate action (i.e. perform a retransmission) following reception of an ACK during a retransmission grant occasion. However, the HARQ source may nevertheless be required to continue listening for retransmission grants (i.e. NACK messages from the HARQ sink) during the remaining retransmission grant occasions (defined by a total of maxHARQ_tx−1) even if the HARQ source receives one or more ACKs from the HARQ sink. The HARQ source may thus be configured to store the uplink message, which may be e.g. a Media Access Control (MAC) Protocol Data Unit (PDU), in a HARQ buffer, and may hold the uplink message in the HARQ buffer for the duration of the HARQ transmission cycle and transmit the uplink message from the HARQ buffer upon receipt of a retransmission grant. As dictated by the network, the HARQ source may thus be required to listen every 8 ms during all possible maxHARQ_tx−1 retransmission grant occasions, regardless if the transmitter previously received an ACK or a NACK. For example, this may be required by the network in order to account for any potential NACK-to-ACK errors, such as e.g. if the HARQ sink transmitted a NACK which was erroneously decoded as an ACK by the HARQ source due to data corruption during transmission. The aforementioned errors may thus be referred to as mistakenly decoded NACKs.

The HARQ source may not perform a retransmission in response to a mistakenly decoded NACK, as the HARQ source may mistakenly believe an ACK was transmitted by the HARQ sink. The HARQ sink may in fact be expecting a retransmission, and upon not receiving a retransmission the HARQ sink may transmit another retransmission grant (NACK) during the next retransmission grant occasion in order to attempt to request another retransmission from the HARQ source. Accordingly, the HARQ source may be required to continuously monitor for subsequent retransmission grants (NACKs) during the remaining retransmission grant occasions in the case of a mistakenly decoded NACK in order to receive a following NACK from the HARQ sink requesting retransmission. The retransmission may thus occur at a later time as opposed to being completely missed due to premature termination of retransmission grant monitoring. Such behavior requiring monitoring during each of the possible maxHARQ_tx−1 retransmission grant occasions may thus potentially avoid missed retransmission grants, thereby preventing excessive data packet loss.

The HARQ source may additionally be configured to listen for all remaining retransmission grant occasions even after receiving an initial ACK in order to allow for the HARQ sink to delay receipt of retransmissions to a later time. For example, the HARQ sink may unsuccessfully receive a HARQ transmission from the HARQ source, and thus may wish to receive a retransmission. However, the HARQ sink may be experiencing high traffic conditions, may have assigned priority to reception of data from another connected mobile terminal, or may be facing poor radio conditions, and may accordingly wish to receive the retransmission at a later time, i.e. may not wish to receive the retransmission in response to the next immediate retransmission grant occasion. The HARQ sink may thus transmit an ACK to the HARQ source, which will direct the HARQ source to not perform a retransmission during the next retransmission grant occasion. The HARQ sink may then decide a subsequent retransmission grant occasion is appropriate for receiving a retransmission, and may send the HARQ source a NACK in time for receipt during the subsequent retransmission grant occasion. The HARQ source may thus be configured to continue monitoring all retransmission grant occasions remaining in the current HARQ transmission cycle even following a received ACK, and may thus receive the NACK (indicating a delayed retransmission grant in this scenario) during the subsequent retransmission grant occasion identified by the HARQ sink. The HARQ source may then retransmit the message during the subsequent retransmission grant occasion, thereby completing the delayed retransmission process.

The HARQ sink may be required to either send an ACK or a NACK during each retransmission grant occasion. For example, the HARQ sink may successfully decode the initial message during the initial transmission period (i.e. t=0), and may accordingly not require any future retransmissions. The HARQ sink may thus send an initial ACK in response to the initial uplink message, followed by maxHARQ_tx−1 ACKs during the remaining retransmission grant periods. The HARQ source may receive each ACK, and subsequently may not perform any further retransmissions in response to the received ACKs. In the aforementioned detailed scenario regarding delayed retransmission requests (i.e. where an initial ACK is transmitted followed by a subsequent NACK), the HARQ sink may unsuccessfully decode the initial HARQ transmission. However, the HARQ sink may decide, such as e.g. due to channel traffic conditions and other transmitter schedules, to postpone the request for retransmission to a later retransmission grant occasion. The HARQ sink may thus continue to send ACK messages during retransmission grant occasions in order to postpone the retransmission to a later retransmission grant occasion. The HARQ sink may then send a NACK to the HARQ source immediately preceding a desired retransmission grant occasion. The HARQ source may then receive the NACK during the retransmission grant occasion, and may subsequently transmit the retransmission during the delayed retransmission grant occasions.

While the HARQ sink may be required to either send an ACK or NACK, it is possible that the HARQ source may not receive either. In other words, the HARQ source may fail to receive either an ACK or a NACK, e.g. if the ACK/NACK was substantially lost during transmission. The HARQ source may be configured to interpret the reception of no feedback message as either positive or negative feedback. For example, in an exemplary aspect of the disclosure, the HARQ source may assume that the reception of no feedback during a retransmission grant occasion is an "ACK", and may proceed as if an ACK has been received. In this scenario, the HARQ source may interpret the reception of no feedback as positive feedback. Alternatively, the HARQ source may interpret the reception of no feedback during a retransmission grant occasion as a "NACK", and may proceed as if a NACK has been received. In this scenario, the HARQ source may interpret the reception of no feedback as negative feedback. The exact behavior may be selected based on desired operation behavior.

FIG. 1 shows mobile radio communication system 100. Mobile radio communication terminal device 102 such as e.g. a User Equipment (UE) 102 may receive a plurality of radio signals from one or more base stations 104, 106, and 108, e.g. via respective radio interfaces 110, 112, and 114. Radio interfaces 110-114 may include one or more physical communication channels, which may be directly used to perform uplink and/or downlink communications between UE 102 and base stations 104-108. It is to be noted that although the further description uses a configuration of mobile radio communication system 100 in accordance with a Universal Mobile Telecommunication System (UMTS) network or Long Term Evolution (LTE) network, for explanation, any other mobile radio communication system 100 may be provided, such as any 3GPP ($3^{rd}$ Generation Partnership Project) mobile radio communication system.

UE 102 may thus be configured to exchange uplink and downlink data with base stations 104-108. As UE 102 is a mobile terminal, the uplink transmit power used to transmit wireless signals from UE 102 to base stations 104-108 may be limited. Additionally, a variety of uplink channel factors, such as e.g. Doppler shift, multipath fading, channel noise, interference, etc. may corrupt uplink data that is wirelessly transmitted from UE 102. Accordingly, certain wireless signals transmitted from UE 102 may not be properly received by the target base station. For example, UE 102 may be in connected mode and may be currently connected to base station 104, e.g. may be transmitting and receiving information to and from a cell associated with base station 104. However, wireless signals transmitted by UE 102 to base station 104 may not be properly decoded by base station 104, e.g. due to corruption of data contained in the wireless signal due to the channel effects of radio interface 110.

Base station 104 may be configured to determine whether the level of corruption of the received data is unacceptable. For example, base station 104 may be configured as a HARQ sink, and may evaluate any received data using error-detecting codes, such as e.g. CRC. Base station 104 may then transmit feedback back to UE 102 based on the determination that indicates whether or not the uplink data was successfully received.

For example, base station 104 may transmit an ACK message to UE 102 if the quality of the received data was acceptable, e.g. if the errors in the received data are minimal or are correctable, such as e.g. with Forward Error Correction (FEC). Base station 104 may then proceed with decoding of the received data, and may correct any errors with FEC.

Alternatively, base station 104 may determine that the received data contains substantial errors, and thus the level of corruption is unacceptable. Base station 104 may then request a retransmission of the data from UE 102 by transmitting a NACK message to UE 102. UE 102 may be similarly configured as a HARQ source, and may then respond to the received NACK message by retransmitting the data according to a HARQ transmission scheme. In other words, NACKs received by UE 102 from base station 104 may be retransmission grants.

Base station 104 may then receive the retransmission and once again determine if the received data is of satisfactory quality. Base station 104 may then transmit another NACK if the data is substantially corrupted, or alternatively may transmit an ACK if the received data was of satisfactory quality. UE 102 may then respond to the ACK or NACK accordingly. Although the remaining disclosure may frequently refer to UE 102 and base station 104, it is understood that the detailed approaches and processes may be implemented according to a variety of HARQ sink/source pairs.

FIGS. 2A and 2B show exemplary diagrams illustrating reception timing schemes for uplink grants and retransmission grant occasions according to a HARQ transmission scheme. Each of FIGS. 2A and 2B detail a different HARQ feedback pattern including a series of received uplink grant, ACK, and NACK (retransmission grant) messages from the perspective of a HARQ source, e.g. UE 102.

As previously detailed, the number of possible HARQ transmissions including HARQ retransmissions in a particular HARQ transmission cycle may be defined by the network-specified parameter maxHARQ_tx. FIG. 2A details a reception timing scheme for UE 102 in DRX mode where maxHARQ_tx is set to maxHARQ_tx=5. The setting of maxHARQ_tx=5 thus dictates that a maximum of 5 total HARQ transmissions (including an initial uplink transmission followed by 4 possible retransmissions) may be performed according to 8 ms intervals for a single uplink message. The particular setting of maxHARQ_tx may thereby also dictate the total number of HARQ retransmission grant occasions, where a total of maxHARQ_tx−1 retransmission grant occasions may occur following an initial HARQ transmission. Accordingly, the HARQ sink may be configured to request a retransmission during any of the maxHARQ_tx−1 retransmission grant occasions following an initial HARQ transmission. The HARQ source may thus be configured to monitor for retransmission requests during the associated HARQ retransmission grant occasions.

FIG. 2A details an exemplary HARQ transmission cycle where UE 102 is operating according to the 3GPP standard. Accordingly, UE 102 may be required to monitor every retransmission grant occasion, regardless if an ACK has been received. As shown in FIG. 2A, UE 102 may receive an initial uplink grant during uplink grant occasion 200 at time t=0 ms from base station 104. UE 102 may then transmit the requested data to base station 104. UE 102 may then be required to monitor for retransmission grants every 8 ms following reception of the initial uplink grant during uplink grant occasion 200 up to the retransmission grant occasion 208 occurring at t=32 ms. For example, UE 102 may be required to monitor at t={8, 16, 24, 32} ms for retransmission grants occasions 202-208. The exact timing scheme may thus correspond to t=8, 16, . . . , 8·(maxHARQ_tx−1) ms, where maxHARQ_tx is set to maxHARQ_tx=5.

Each of retransmission grant occasions 202-208 may indicate the type of HARQ feedback (ACK or NACK) that is received by UE 102 from base station 104. For example, base station 104 may not be able to successfully decode the initial uplink message (which may be e.g. transmitted in response to reception of an initial uplink grant received by UE 102 during HARQ transmission grant occasion 200) received from UE 102 (e.g. as determined by error-detecting code), and consequently may transmit a NACK (retransmission grant) during retransmission grant occasion 202. UE 102 may receive the NACK and may accordingly retransmit the uplink message.

Base station 104 may receive the retransmission, and may then attempt to decode the retransmitted message. However, base station 104 may determine that the received retransmission message was substantially corrupted, and may once again transmit a NACK during retransmission grant occasion 204. UE 102 may receive the retransmission grant during retransmission grant occasion 204 and perform another retransmission of the uplink message.

Base station 104 may then receive the retransmitted message, and may determine that the retransmitted message contains few errors. Base station 104 may thus determine that the quality of the retransmitted message was satisfactory, and may proceed with decoding of the retransmitted message, such as e.g. by performing forward error correction to correct any remaining errors.

Base station 104 may then transmit an ACK to UE 102 during retransmission grant occasion 206. UE 102 may receive the ACK message and in response may not perform a retransmission.

As previously detailed, the HARQ sink, e.g. base station 104, may be required to send either an ACK or a NACK during each retransmission grant occasion, regardless if the uplink message was successfully or unsuccessfully received. Accordingly, base station 104 may then proceed to send a second subsequent ACK during retransmission grant occasion 208, even though base station 104 previously received the uplink message successfully during the second retransmission (i.e. third overall HARQ transmission including the initial uplink grant transmission). UE 102 may then receive the ACK during retransmission grant occasion 208, and may then not transmit a retransmission in response.

Accordingly, in the scenario illustrated in FIG. 2A it may not be necessary for UE 102 to monitor for a retransmission grant during retransmission grant occasion 208, as base station 104 may have successfully received the uplink message following retransmission grant occasion 204 (second retransmission). It may thus be possible for UE 102 to enter into a power-saving mode for retransmission grant occasion 208, thereby conserving battery power.

UE 102 may thus be configured to enter into power-saving mode following the reception of a HARQ ACK message from base station 104 in response to an uplink transmission or uplink retransmission. Such an exemplary scenario is illustrated in FIG. 2B, which details a further exemplary HARQ transmission cycle.

In contrast to the exemplary HARQ transmission cycle of FIG. 2A, UE 102 may be configured to skip one or more retransmission grant occasions following reception of an ACK in the exemplary HARQ transmission cycle of FIG. 2B. UE 102 may receive uplink grant during uplink grant occasion 210 at time t=0, similarly to as performed regarding the HARQ feedback pattern of FIG. 2A, and may subsequently perform initial uplink transmission of the uplink message following reception of the uplink grant. Base station 104 may decode the initial uplink transmission, and may make a determination as to whether a retransmission is necessary.

Base station 104 may determine that a retransmission is necessary (e.g. the uplink message was significantly corrupted), and may transmit a NACK message during retransmission grant occasion 212. UE 102 may receive the NACK message during uplink grant occasion 212, and may subsequently perform a retransmission of the uplink message.

Base station 104 may then receive the uplink message and make a determination as to whether a retransmission is necessary. Base station 104 may have received the retransmitted uplink message at sufficient quality, and may thus determine that no further retransmission are necessary. Base station 104 may then send an ACK message during retransmission grant occasion 214, which may be subsequently received by UE 102.

As opposed to the scenario of FIG. 2A, UE 102 may be configured to skip monitoring of the remaining retransmission grant occasions 216 and 218 following reception of the first ACK message from base station 104 during retransmission grant occasion 214. As a result, UE 102 may deactivate the receiver and enter a power-saving mode during retransmission grant occasions 216 and 218, thereby conserving battery power. "Skipped" retransmission grant occasions 216 and 218 are thus denoted with dashed lines as opposed to "monitored" retransmission grant occasions 212 and 214, and such "skipped" retransmission grant occasions will be denoted accordingly hereafter.

As base station 104 has already successfully received the uplink message during the first retransmission, base station 104 may continue to send ACK messages during retransmission grant occasions 216 and 218. UE 102 may enter a power saving mode during retransmission grant occasions 216 and 218, and thus may "skip" monitoring of retransmission grant occasions 216 and 218 for reception of possible retransmission grants therein (as denoted by the dashed lines of retransmission grant occasions 216 and 218). There may be no penalties associated with skipping monitoring of retransmission grant occasions 216 and 218 in the exemplary HARQ transmission cycle illustrated in FIG. 2B, such as a missed NACK resulting in a missed retransmission, as base station 104 may have already successfully received the uplink message. Additionally, UE 102 may be able to conserve battery power by utilizing e.g. power/clock gating of temporarily not required modem subcomponents during retransmission grant occasions 216 and 218.

Accordingly, it may be advantageous in certain scenarios for UE 102 to skip monitoring of the remaining retransmission grant occasions (up to the final (maxHARQ_tx−1)$^{th}$ retransmission grant occasion in the current HARQ transmission cycle) following reception of a first ACK from base station 104, i.e. the HARQ sink. This may offer significant benefits in terms of battery preservation, as UE 102 may deactivate the receiver and enter into a power saving mode during the remaining retransmission grant occasions.

However, a configuration of UE 102 in which all remaining retransmission grant occasions are skipped following a received ACK in favor of power saving mode may result in significant penalties in other exemplary scenarios. For example, UE 102 may mistakenly decode a NACK message (retransmission grant) from base station 104 as an ACK message, e.g. due to corruption in the wireless channel. UE 102 may then mistakenly assume that base station 104 has successfully received the uplink data, and may decide to skip the remaining retransmission grant occasions in the current HARQ transmission cycle. Accordingly, base station 104 may be requesting a retransmission, but due to the mistaken interpretation of the retransmission grant as an ACK UE 102 may enter power saving mode without performing the requested retransmission. Base station 104 may continue to send retransmission grants to UE 102 during the subsequent retransmission grant occasions; however, UE 102 may skip monitoring of the retransmission grant occasions and may consequently never perform the requested retransmission. The data contained in the message may be lost as a result.

FIG. 2C illustrates such a scenario where skipping of retransmission grant occasions may result in data packet loss at the HARQ sink.

Similarly to as detailed regarding the scenario of FIG. 2B, UE 102 may receive an uplink grant during uplink grant occasions 220 and a subsequent NACK in retransmission grant occasion 222, e.g. as a result of base station 104 being unable to properly decode the initial transmission of the uplink message.

UE 102 may thus perform a first retransmission in response to the NACK (retransmission grant) received during retransmission grant occasion 222. Due to e.g. poor channel conditions, base station 104 may be unable to properly decode the retransmitted uplink message. Base station 104 may thus transmit another NACK during retransmission grant occasion 224, thereby requesting a second retransmission of the uplink message.

However, the NACK (retransmission grant) transmitted during retransmission grant occasion 224 may be mistakenly decoded by UE 102 as an ACK (i.e. a mistakenly decoded NACK scenario), such as e.g. due to poor channel quality or receiver error. Accordingly, UE 102 may interpret the intended retransmission grant (NACK) as an ACK, and as a result may mistakenly assume that base station 104 has successfully received the uplink message as a result of the second retransmission. UE 102 may then decide to skip monitoring of retransmission grants during retransmission grant occasions 226 and 228, and may e.g. deactivate the receiver in order to enter a power saving mode.

However, base station 104 may have actually transmitted a NACK in order to trigger a retransmission of the uplink message by UE 102. Base station 104 may thus be expecting a retransmission following retransmission grant occasion 224, and may not receive a retransmission as requested. Base station 104 may subsequently transmit another NACK during retransmission grant occasion 226; however, UE 102 may have decided to skip monitoring of retransmission grant occasion 226 (denoted by the dashed lines of retransmission grant occasion 226), and accordingly may not receive the retransmission grant. Base station 104 may attempt a final time to transmit a retransmission grant during retransmission grant occasions 228, which UE 102 similarly will not receive. As maxHARQ_tx may be set to maxHARQ_tx=5, retransmission grant occasion 228 may be the final permitted retransmission grant occasion, and the data contained in the uplink message may be subsequently lost.

Data packet loss may additionally occur if the HARQ sink attempts to receive a delayed retransmission, i.e. where the HARQ sink transmits an initial ACK in response to an unsuccessfully decoded message followed by a delayed NACK at a later time. Such a scenario is illustrated in FIG. 2D, where base station 104 may transmit an ACK during retransmission grant occasion 234. However, base station 104 may have determined that a delayed retransmission is needed, and accordingly may have transmitted an ACK during retransmission grant occasion 234 in order to delay request of the retransmission until a later retransmission grant occasion. For example, base station 104 may decide to delay reception of the retransmitted message until retransmission grant occasion 236. However, UE 102 may interpret the received ACK during retransmission grant occasion 234 as an indication that base station 104 successfully received the uplink message. UE 102 may accordingly skip monitoring of retransmission grant occasions 236 and 238, such as e.g. in order to enter power saving mode. As denoted in FIG. 2D, base station 104 may transmit an NACK (retransmission grant) during retransmission grant occasion 236 in order to receive the retransmitted uplink message subsequent to retransmission grant occasion 236. As UE 102 has already entered power saving mode, UE 102 may not receive the transmitted NACK of retransmission grant occasion 236, and may as a result miss the retransmission grant. Base station 104 may again transmit a retransmission grant during retransmission grant occasion 238 in a further attempt to request retransmission; however, UE 102 may remain in power saving mode and subsequently fail to receive and execute the retransmission grant. Accordingly, the uplink message may be lost. It is noted that base station 104 may be capable of delaying the retransmission more than one retransmission grant occasion, such as e.g. by transmitting multiple ACKs followed by a NACK, thereby the UE 102 may be receiving the retransmission request during a retransmission grant occasion occurring multiple retransmission grant occasions after the initial ACK. The amount of retransmission grant occasions that base station 104 may delay the retransmission request may be dependent on maxHARQ_tx, as retransmission grants may only be fulfilled during one of the maxHARQ_tx−1 possible retransmission grant occasions.

It may thus be advantageous to monitor a certain number of retransmission grant occasions immediately following an initial received ACK, and to enter power saving mode only if the certain number of monitored retransmission grant occasions are also ACKs and there are retransmission grant occasions remaining in the current HARQ transmission cycle. For example, UE 102 may be configured to monitor k consecutive retransmission grant occasions immediately following a received ACK from base station 104. UE 102 may then be configured to skip any remaining retransmission grant occasions if all of the k consecutive retransmission grants are also ACKs (or non-NACKs, e.g. where no feedback information is received, as will be later described). The aforementioned described examples in FIGS. 2C and 2D therefore detailed a configuration in which UE 102 is set to k=0, i.e. all remaining retransmission grant occasions are skipped following receipt of the first ACK. The parameter k may thus be set to any value k=0, 1, . . . , maxHARQ_tx−2, where k=maxHARQ_tx−2 is equivalent to the default configuration where all possible retransmission grant occasions are monitored.

Alternatively to the k=0 and k=maxHARQ_tx−2 configurations, UE 102 may be configured to monitor the retransmission grant occasion immediately following reception of an ACK, i.e. k=1, as long as the ACK was received prior to or at the (maxHARQ_tx−2)$^{th}$ retransmission grant occasion (i.e. prior to the final retransmission grant occasion of the HARQ cycle). If the immediately following retransmission grant occasion is also an ACK, UE 102 may then proceed to skip the remaining retransmission grant occasions in favor of entering power saving mode. If the immediately following retransmission grant occasion contains a NACK, UE 102 may then perform a retransmission in response to the retransmission grant. The initially received ACK may thus have been in error or be part of a delayed retransmission request schedule, and data packet loss may be avoided by monitoring an additional retransmission grant occasion for potential retransmission grants.

The possible settings of k, e.g. from k=0 to k=maxHARQ_tx−2, may offer varying tradeoffs between battery preservation and potential data loss. For example, performing retransmission grant occasion monitoring according to the k=1 scheme may offer reduced data loss over the k=0 scheme, such as e.g. in the scenarios detailed in FIGS. 2C and 2D where UE 102 is configured according to the k=0 scheme. For example, UE 102 configured to operate according to k=1 may thus be configured to monitor the retransmission grant occasion immediately following reception of an ACK. Accordingly, UE 102 may monitor retransmission grant occasions 226 and 236 in FIGS. 2C and 2D, in spite of receiving ACKs in retransmission grant occasions 224 and 234, respectively. As UE 102 may have mistakenly decoded the NACK of retransmission grant occasion 224 as an ACK, UE 102 may thus receive the subsequent NACK transmitted by base station 104 during retransmission grant occasion 226, and may accordingly perform a retransmission in response to the retransmission grant received in retransmission grant occasion 226. Similarly, UE 102 may have received an ACK during retransmission grant occasion 234 from base station 104, which was transmitted by base station 104 with the intention of transmitting a later NACK (retransmission grant) to receive a delayed retransmission. Accordingly, UE 102 executing a k=1 scheme may monitor retransmission grant occasion 236, and may subsequently receive the NACK transmitted by base station 104 therein. Data packet losses associated with the originally described scenarios of FIGS. 2C and 2D may thus be avoided. UE 102 may then be configured to continue monitoring during retransmission grant occasions 228 and 238 in order to receive further ACK/NACK HARQ feedback in response to the retransmissions performed after retransmission grant occasions 228 and 238.

In certain scenarios, UE 102 may be configured to interpret retransmission grant occasions where no feedback information is received as positive feedback information. UE 102 may therefore interpret a retransmission grant occasion following an ACK where no feedback information is received as positive feedback. For example, UE 102 may be operating with k=1, and may receive a first ACK from base station 104. UE 102 may then be configured to monitor the next retransmission grant occasion, and to skip any remaining retransmission grant occasions if the next retransmission grant occasion contains positive feedback information. Accordingly, UE 102 may receive either an ACK or no feedback information during the next retransmission grant occasion, and may subsequently skip any remaining retransmission grant occasions in the current HARQ transmission cycle. UE 102 may thus consider retransmission grant occasions where no feedback is received as positive feedback. However, it is noted that UE 102 may not interpret a retransmission grant occasion containing no feedback as an initial ACK, and may only interpret retransmission grant occasions containing no feedback as one of the k retransmission grant occasions containing positive feedback following an initial ACK.

As previously detailed, each of the possible k values, each defining a different number of retransmission grant occasions to monitor following reception of an ACK, may offer a unique tradeoff between power conservation (maximum at k=0) and data loss reduction (maximum at k=maxHARQ_tx−2, which is equivalent to the standard of listening to all retransmission grant occasions). Depending on radio link conditions, it may be advantageous to set k to a higher or lower value. For example, it may be beneficial to set k=0 or 1 during high radio link quality, as it may be less likely that a NACK will be mistakenly decoded as an ACK (as detailed regarding FIG. 2C). Additionally, it may be less likely that the HARQ sink (e.g. base station 104) may attempt to execute a delayed retransmission request schedule in good radio conditions. Battery power may thus be conserved due to the higher number of potentially skipped retransmission grant occasions while minimizing data packet loss due to mistakenly decoded NACKs.

Alternatively, it may be beneficial to set k=maxHARQ_tx−2 or maxHARQ_tx−3 during poor radio link conditions, as there may be an increased likelihood of NACKs mistakenly decoded as ACKs. There may additionally be an increased likelihood that base station 104 may execute a delayed retransmission request schedule in poor radio conditions. Accordingly, it may be more essential to minimize data packet loss at the cost of increased power usage associated with monitoring all or nearly all retransmission grant occasions.

The HARQ source may therefore be configured to adapt k based on radio link quality. For example, UE 102 may be configured to set k to a low value in good radio link conditions, and to set k to a high value in poor radio link conditions. Accordingly, UE 102 may adapt k based on radio link conditions, thereby balancing battery conservation with potential data packet loss in an effective manner.

Figure 3:
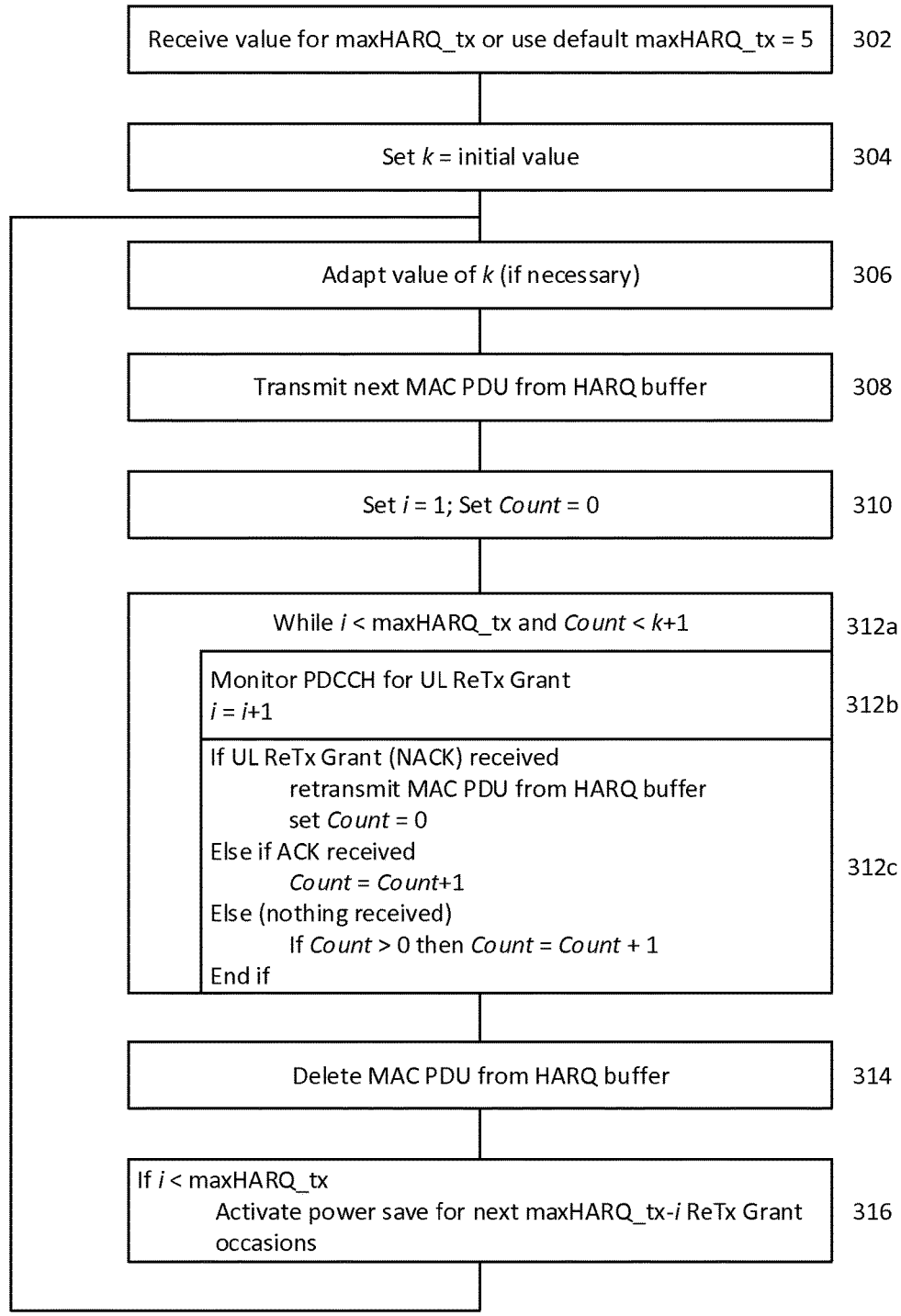
FIG. 3 shows a flow diagram illustrating a HARQ transmission process.

FIG. 3 shows a flow chart 300 detailing a process for performing HARQ transmissions using adaptations of the parameter k. The process of flow chart 300 may be implemented by a HARQ source such as e.g. UE 102. How chart 300 may first include receiving a value to use for maxHARQ_tx in 302, such as e.g. as specified by the network via Radio Resource Control (RRC) signaling. Alternatively, if no value is received, 302 may utilize maxHARQ_tx=5 as the default value.

304 may set k to an initial value. The initial value of k may be based on any value from k=0, 1, . . . maxHARQ_tx−2, and may be determined based on radio link conditions, packet loss rate, past battery usage, remaining battery power, etc. 306 may then include adapting the value of k, as will be later described.

308 may identify the next uplink message to be transmitted. This uplink message may be a Media Access Control (MAC) Protocol Data Unit (PDU), i.e. a message to be exchanged between the HARQ source (e.g. UE 102) and the HARQ sink (e.g. base station 104). The MAC PDU may be stored in the HARQ buffer, which is the uplink data buffer used to store messages intended for uplink HARQ transmission. The MAC PDU may be held in the HARQ buffer for the entire duration of the individual HARQ cycle, i.e. from initial transmission until the final HARQ retransmission grant occasion has completed. Accordingly, the HARQ buffer may store the MAC PDU and provide the MAC PDU for wireless transmission for any necessary uplink transmissions and/or retransmissions.

308 thus may transmit the next MAC PDU from the HARQ buffer, i.e. the initial uplink transmission. The transmission of 308 may be triggered by reception of an uplink grant, such as e.g. the uplink grants received during uplink grant occasions 200, 210, 220, and 230 in FIGS. 2A-2D. The HARQ source may thus transmit the MAC PDU from the HARQ buffer in response.

The HARQ retransmission process may then begin in 310. The variable i may indicate the total number of HARQ transmissions (including the initial uplink transmission of 308). The variable Count may represent the number of non-NACK messages (e.g. ACKs and non-feedback periods) received during a single HARQ transmission cycle. The variable i may be set to 1, i.e. for a single HARQ transmission, and Count may be set to 0 to indicate no currently received non-NACK messages (as no HARQ feedback has been received at this point).

Process 300 may then proceed to 312a-312c, which detail each of the maxHARQ_tx−1 possible HARQ retransmissions. As detailed in 312a, HARQ feedback evaluation loop 312 (comprising 312a-312c) may iterate until either i=maxHARQ_tx (i.e. the maximum number of HARQ transmissions and retransmission grant occasions defined by maxHARQ_tx have been completed) or until the number of consecutive non-NACK messages reaches k+1. Accordingly, 312a may compare the current values of i and Count to the appropriate loop-exit thresholds in order to determine if a next retransmission grant occasion should be monitored.

The HARQ source may monitor the appropriate downlink channel (i.e. Physical Downlink Control Channel (PDCCH) or Physical Hybrid-ARQ Indicator Channel (PHICH), over which retransmission grants are transmitted) for a retransmission grant during the next retransmission grant occasion in 312b.

HARQ feedback evaluation loop 312 may then evaluate the HARQ feedback received during the current retransmission grant occasion in 312c. If a NACK (retransmission grant) is received, 312c may retransmit the MAC PDU from the HARQ buffer. The variable Count may then be set to 0, as zero consecutive non-NACK messages have been received. HARQ feedback evaluation loop 312 may then begin with the next iteration in 312a.

Alternatively, if an ACK was received in 312c, HARQ feedback evaluation loop 312 may increment the variable Count to Count=Count+1 to denote that an ACK has been received, thereby incrementing the number of consecutive non-NACK messages received.

Alternatively, if nothing was received (i.e. neither an ACK nor a NACK was received), but an ACK was received during a previous HARQ retransmission grant occasion (i.e. Count>0), 312c may also increment Count to Count=Count+1 to indicate reception of a non-NACK messages. Accordingly, HARQ feedback evaluation loop 312 may treat non-feedback period scenarios as reception of an ACK.

HARQ feedback evaluation loop 312 may then repeat by checking the current values of i and Count. HARQ feedback evaluation loop 312 may thus repeat until either i=maxHARQ_tx (indicating the maximum number of HARQ transmission occasions have occurred) or Count=k+1 (indicating that the appropriate number of non-NACK HARQ feedback messages have been received according to k). If neither of the conditions of 312a are satisfied, HARQ feedback evaluation loop 312 repeats, and the PDCCH or PHICH is monitored during the subsequent retransmission grant occasion for reception of HARQ feedback. The variables i and Count are updated appropriately based on the type of HARQ feedback received. HARQ feedback evaluation loop 312 performs further iterations based on the updated values of i and Count.

If i=maxHARQ_tx, the maximum number of HARQ transmission occasions for the HARQ cycle has been reached, and HARQ feedback evaluation loop 312 exits. If Count=k+1, HARQ feedback evaluation loop 312 also exits. For example, if k is initially set to zero in 306, and an ACK is received during the most recent loop of HARQ feedback evaluation loop 312, HARQ feedback evaluation loop 312 will exit, as a single ACK has been received. Alternatively, if k is initially set to a value greater than zero in 306, HARQ feedback evaluation loop 312 will exit upon receiving k non-NACK messages (i.e. either an ACK messages no feedback) following an initial ACK message.

Following exit of HARQ feedback evaluation loop 312, process 300 may proceed to 314. As the HARQ transmission cycle for the stored MAC PDU is complete, the MAC PDU may be deleted from the HARQ buffer as the MAC PDU is no longer needed.

In 316, process 300 may check if i<maxHARQ_tx. If i<maxHARQ_tx, the maximum number of HARQ transmission occasions defined were not monitored, and as a result there exist remaining HARQ transmission occasions in the HARQ transmission cycle. This scenario corresponds to an exit of HARQ feedback evaluation loop 312 triggered by Count reaching k, i.e. an early exit of the loop triggered by a sufficient number of consecutive non-NACK messages received immediately following an ACK as defined by k. Accordingly, the HARQ source may enter a power saving mode (e.g. power/clock gating of temporarily not required modem subcomponents for the cellular protocol stack) for the remaining maxHARQ_tx−i retransmission grant occasions, which are the remaining number of retransmission grant occasions in the current HARQ cycle. The HARQ source, e.g. UE 102, may thus conserve battery power for the remaining duration of the current HARQ cycle.

Following 316, process 300 may return to 306 in order to transmit the next scheduled uplink MAC PDU. Process 300 may now adapt the value of k in 306, which was set at the initial value in 304 for the first MAC PDU transmission. The value of k may thus be updated to a value, such as based on radio link conditions, packet loss rate, past battery usage, remaining battery power, etc. 308-316 may then be repeated for the next MAC PDU based on the updated value of k.

It is understood that while the adaptation of k 306 in process 300 is shown to be performed before the transmission of the MAC PDU in 308, k may also be adapted at numerous other times during process 300, e.g. as UE 102 is leaving power saving mode after 316. Additionally, the adaptation of k may be triggered by another event other than the detection of a new MAC PDU to be transmitted. For example, the trigger could be the expiration of a timer, e.g. wherein k is updated periodically according to the timer.

UE 102 may alternatively or additionally adapt k based on radio conditions. As the quality of the wireless channel may vary with time, it may be advantageous to monitor radio conditions in order to determine a proper corresponding value for k. A metric such as Signal to Interference plus Noise Ratio (SINR) may be utilized in order to quantify the downlink channel, thereby offering an indication of radio conditions for each frequency and point in time individually. However, LTE networks have provided a simpler measure in the Channel Quality Indicator (CQI), which utilizes 16 integer index values in order to represent SINR values ranging from −6 to 20 dB. High values for CQI may correspond to high values of SINR, thereby indicating high channel quality. Correspondingly, low values for CQI may correspond to low values of SINR, thereby indicating poor channel quality. UEs operating according to the LTE standard may measure CQI on downlink signals received from a base station. UEs may measure CQI according to a periodic schedule (such as e.g. every cycle in DRX mode) in addition to aperiodically upon request by the base station.

UE 102 may thus utilize CQI in order to evaluate current radio conditions, and adapt k therewith. For example, UE 102 may be configured to evaluate the measured CQI during every CQI reporting period. Alternatively, UE 102 may be configured to periodically evaluate the measured CQI every CQI period according to a certain number of CQI reporting periods. UE 102 may then be configure to adapt k based on the current CQI value.

For example, UE 102 may be configured to select a low value for k, e.g. k=0 or k=1, if the measured CQI is high, thereby indicating strong radio conditions. Strong radio conditions may result in a low likelihood of mistakenly decoded NACKs, thereby allowing for lower values of k without significant risk of missed retransmission requests. Base station 104 may also be assumed to be less likely to initiate delayed retransmissions in strong radio conditions. Poor radio conditions may be indicated by low CQI values, thereby representing an increased likelihood of mistakenly decoded NACKs and delayed retransmissions initiated by base station 104. UE 102 may be configured to select a higher value for k, such as e.g. k=maxHARQ_tx−2 (corresponding to the standard configuration) or k=maxHARQ_tx−1, which may in turn reduce the likelihood of mistakenly decoded NACKs.

UE 102 may be configured with an algorithm mapping measured CQI values to appropriate settings for k. For example, each possible CQI value (i.e. from [0:15]) may be mapped to a setting for k. High CQI values, such as e.g. 15, may be mapped to lower values of k, while low CQI values, e.g. 0, may be mapped to higher values of k. UE 102 may thus compare the measured CQI to the mapping in order to select an appropriate value of k based on the measured CQI.

However, such a strict-mapping approach may result in unnecessary fluctuations between values of k. For example, despite quantizing the entire range from −6 to 20 dB into 16 integer values, the CQI measured by a UE may fluctuate by ±1 to ±2 index values during a typical period of CQI reporting. Accordingly, it may be advantageous to implement a hysteresis-approach in order to prevent the UE from changing the value of k based on the measured CQI unnecessarily frequently.

Figure 4:
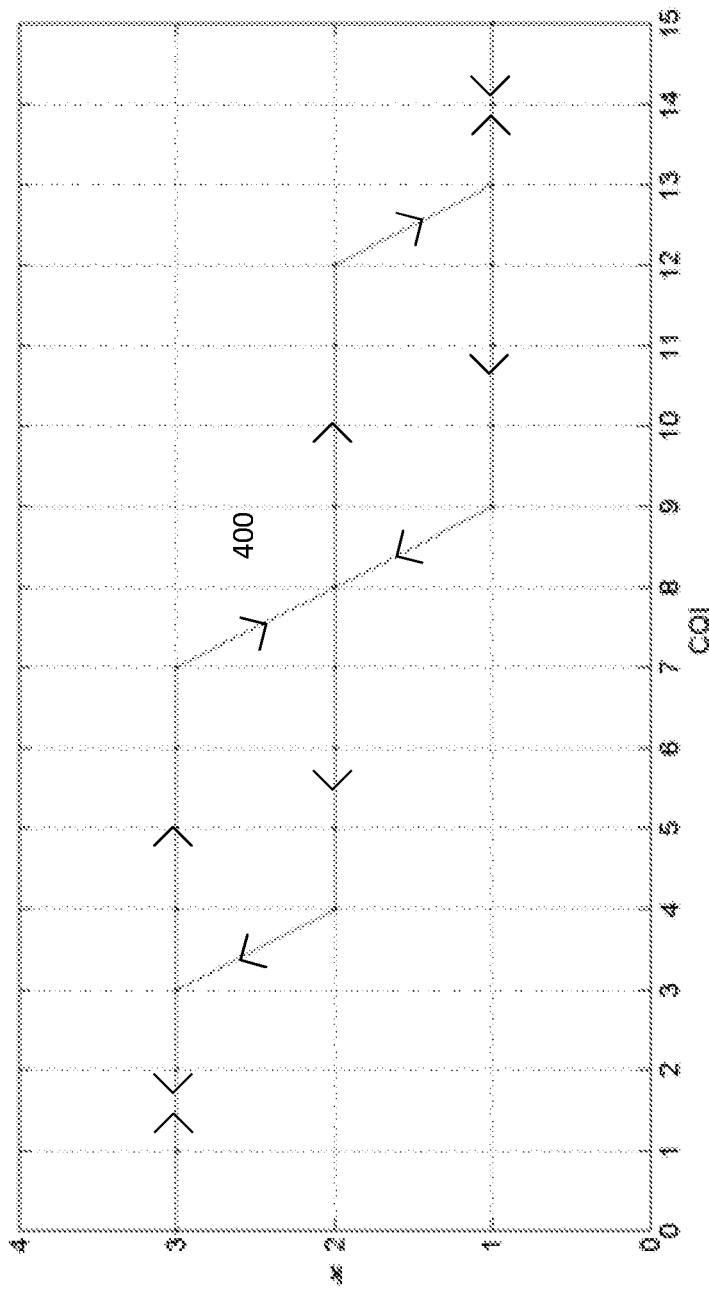
FIG. 4 shows a chart illustrating selection of a HARQ retransmission parameter using hysteresis.

An example for the use of hysteresis in selection of k for UE 102 is shown in FIG. 4. FIG. 4 details an exemplary relationship with maxHARQ_tx=5 between measured CQI and appropriate settings for k. As maxHARQ_tx=5, k may range from k=0 to k=maxHARQ_tx−2=3 (i.e. the standardized implementation). However, UE 102 may limit k to 1≤k≤3. Accordingly, k may never be set to k=0 in order to enable the HARQ sink (e.g. base station 104) to schedule retransmission in a flexible manner, i.e. delaying retransmissions by transmitting an initial ACK followed by a later NACK to trigger a delayed retransmission.

In the example detailed in FIG. 4, UE 102 may be configured according to hysteresis curve 400. UE 102 may be configured to select k based on the directional indicator arrows shown on hysteresis curve 400.

UE 102 may thus be configured to receive up to four uplink HARQ feedback messages (i.e. the initial ACK/NACK followed by up to three retransmission grants) in poor radio conditions, i.e. from CQI values ranging from 0 to 8, to allow for flexible scheduling of those retransmissions by base station 104. As a result, base station 104 may have a number of different timing options for rescheduling retransmission using ACKs followed by delayed retransmission grants, which may be useful during poor radio conditions.

If the measured CQI improves to a value of 8 or higher (such as e.g. the CQI measured during a later CQI reporting period), UE 102 may be configured to reduce k to k=2, as denoted by hysteresis curve 400. Furthermore, if the measured CQI improves to 13 or higher, k may be reduced to k=1.

However, if radio conditions begin to worsen (i.e. as denoted by the measured CQI), k may be increased again to k=2 if the CQI falls below 9 as detailed by hysteresis curve 400. Accordingly, hysteresis curve 400 may dictate that k not be able to quickly switch between k=1 and k=2.

Similarly, if the measured CQI further decreases to 3 or lower, k may be increased back to k=3. Hysteresis curve 400 may thus not allow k to rapidly switch between values, thereby preventing unnecessary fluctuations of k.

Alternatively to applying a hysteresis mapping such as hysteresis curve 400, UE 102 may be configured to apply a smoothing function over several measured CQI values. For example, UE 102 may be configured to calculate an average or mean value of the last n measured CQI values, and determine an appropriate value of k based on a mapping using the averaged CQI value rounded to the nearest integer.

UE 102 may alternatively be configured to perform exponential smoothing in order to determine k. For example, UE 102 may compute a parameter CQI', where CQI'(1)=CQI'(0)=CQI(measured at time index 1), and CQI'(n+1)=(1−α)·CQI(measured at time index n+1)+α·CQ'(n), where 0<α. The measured CQI used to map to an appropriate k may thus be calculated by rounding CQI'(n+1) to the nearest integer, and selecting k accordingly.

Alternatively to a CQI implementation, k may be updated upon a determination that an error rate exceeds or falls below a certain threshold. For example, an error rate may be monitored by process 300 or a higher protocol layer such as Radio Link Control (RLC). The error rate may be based on the number of ACK, NACK, and non-feedback messages received, and accordingly k may be increased or decreased back on the error rate exceeding or falling below an error rate threshold. For example, UE 102 may determine that a low number of NACKs have been received, e.g. compared to the number of non-NACKs received. UE 102 may then determine that radio conditions are of high-quality, and consequently the probability of mistakenly receiving a NACK as an ACK is low. UE 102 may then determine that a reduction in k will not yield unacceptable error rates, e.g. due to missed retransmission requests resulting from mistakenly decoded NACKs, and may then reduce k to a lower value.

In contrast, if the error rate based on the relative numbers of received ACK, NACKs, and non-feedback periods is high, UE 102 may be configured to increase k. For example, UE 102 may determine that a high number of NACKs have been received, thereby indicating poor radio conditions. UE 102 may then increase k in order to avoid retransmission errors resulting from mistakenly decoded NACKs.

UE 102 may also consider whether or not ACKs are received as part of a delayed retransmission scenarios in the calculation of the error rate. For example, UE 102 may receive an initial ACK from base station 104. However, base station 104 may have transmitted the ACK with the intention of transmitting a subsequent NACK in order to receive a delayed retransmission. Accordingly, the initial ACK (as well as any further ACKs received before reception of the subsequent NACK) may not indicate successful reception of the uplink transmission. UE 102 may therefore only consider ACK messages that were not followed by a subsequent NACK in a HARQ transmission cycle as ACK messages for the purpose of calculating a retransmission rate, i.e. ACK messages that were not received as part of a delayed retransmission request. Furthermore, UE 102 may be configured to consider the subsequently received NACK (as well as any NACKs received before the initial ACK) in determination of the error rate, as base station 104 did not initially receive the uplink message successfully.

UE 102 may thus factor ACKs into the error rate only if no NACK messages are received after the ACK in the current HARQ transmission cycle. This configuration may prevent ACKs received as part of a delayed retransmission request from being incorrectly interpreted as successful reception of an uplink signal. Similarly, mistakenly decoded NACKs (i.e. NACK messages mistakenly decoded as ACKs) may not be interpreted as an ACK in the event that UE 102 receives a NACK during a later retransmission grant occasion. UE 102 may thus determine an error rate that more accurately reflects whether received ACKs/NACKs actually indicated successful or unsuccessful reception of uplink messages or not.

Furthermore, k may be updated upon receipt of signaling information from the network detection where the network indicates that an unacceptable number of packets have been lost. For example, UE 102 may be executing process 300 using k=0, and accordingly may be configured to enter power saving mode for the duration of a HARQ transmission cycle following receipt of a first HARQ ACK message. However, unacceptable data loss may occur due to missed retransmissions while UE 102 is in power saving mode. For example, a higher number of the ACKs may have actually been transmitted NACKs that were mistakenly decoded as ACKs, thereby leading UE 102 to enter into power saving mode and miss any subsequent retransmission grants from the HARQ sink (e.g. base station 104). Likewise, UE 102 may have received a high number of transmitted ACKs from the HARQ sink that the HARQ sink intended to utilize as delayed retransmissions, i.e. by transmitting an ACK followed by a later NACK to request a retransmission at a later time. UE 102 may thus receive the initial ACK and enter power saving mode, thereby missing the later retransmission request.

Accordingly, the HARQ sink (base station 104) may determine that a large number of data packets are being lost as a result of the current setting of k being used by UE 102. Base station 104 may then transmit signaling information to UE 102 in order to notify UE 102 of the excessive data loss. UE 102 may then adapt k, e.g. to a higher value in order to minimize future data loss.

UE 102 may additionally wish to adapt k based on remaining power level. As previously detailed, low values of k may lead to lower power usage, thereby conserving battery power. UE 102 may thus be configured to determine that battery power is low, e.g. that the remaining battery power falls below a threshold, and as a result set k to a lower value. UE 102 may thus conserve battery power due to the increased number of retransmission grant occasions that may potentially be skipped in favor of activating power saving mode. Alternatively, UE 102 may monitor battery power usage over a period of time, and may adapt k based on the determined battery power usage over time.

It is understood that hysteresis-based approaches may be utilized for any of the above-detailed approaches regarding adaptations of k. Additionally, a plurality of criteria for adapting k, such as radio link conditions, packet loss rate, past battery usage, remaining battery power, may be used in coordination to adapt k. For example, two of the criteria may be used to determine whether adaptations of k are necessary, and if so, to determine an appropriate value of k. It is understood that any such combinations may be implemented.

Figure 5:
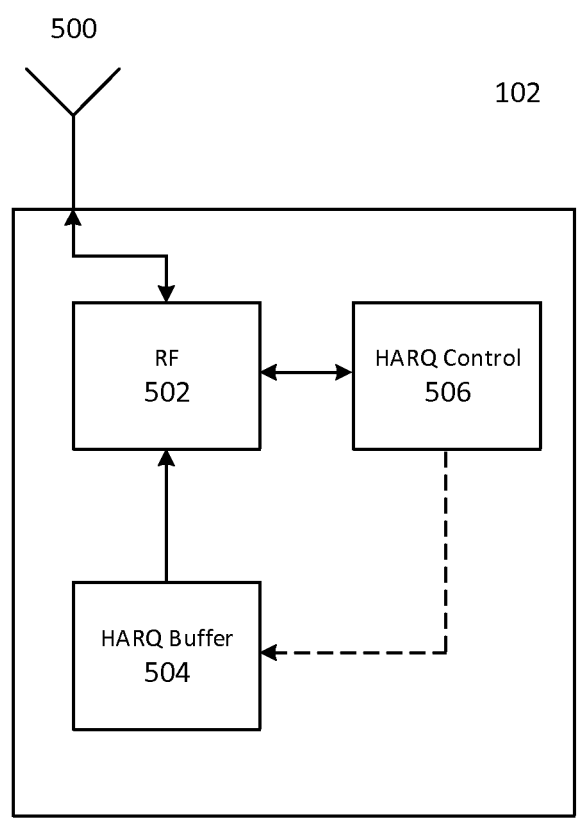
FIG. 5 shows various circuits and components of a mobile radio communication terminal device.

FIG. 5 shows an exemplary configuration of UE 102 in accordance with an aspect of the disclosure. As shown in FIG. 5, UE 102 may include antenna 500, RF transceiver 502, HARQ buffer 504, and HARQ control circuit 506. The aforementioned internal components of UE 102 may be implemented as e.g. circuits or other hardware such as e.g. processors. One or more of the internal components of UE 102 may additionally be implemented by a processor executing software. It is understood that some or all of the circuits and/or hardware may be implemented by a common programmable processor, such as e.g. a microprocessor. Accordingly, some or all of the functionality of the one or more of the aforementioned components may be consolidated into a single hardware component. It is also understood that UE 102 may include a number of additional components, including hardware, processors, memory, and other specialty or generic hardware/processors/circuits, etc., in order to support a variety of additional operations of wireless radio communications. UE 102 may also include a variety of user input/output devices such as displays, keypads, touchscreens, speakers, external buttons, etc.

Antenna 500 may be composed of a single antenna, or alternatively may be an antenna array composed of a plurality of antennas. Antenna 500 may receive wireless radio signals, such as e.g. mobile communication signals received over wireless radio interfaces 110-114 from base stations 104-108. Antenna 500 may transduce the received wireless radio signals and provide resulting electrical radio frequency signals to RF transceiver 502. RF transceiver 502 may be configured to demodulated and digitize the radio frequency signals received from antenna 500, such as e.g. by selecting a carrier frequency and performing analog to digital conversion of the radio frequency signal. RF transceiver 502 may select a carrier frequency to receive radio frequency signals based on the carrier frequencies of one or more transmitting cells, such as e.g. one or more cells located at base stations base stations 104-108, and accordingly may receive desired signals transmitted by the one or more transmitting cells. RF transceiver 502 may then provide the resulting digitized signals to one or more components of UE 102, such as e.g. one or more processing circuits (not explicitly shown). UE 102 may then be configured to perform appropriate actions in response to the digitized signals, such as e.g. providing a user with voice data or other data information, performing cell measurements, monitoring for user input and/or other commands, or a variety of additional mobile communication operations. It is understood that such functionality of mobile terminals is well-known by those of skill in the art, and accordingly will not be further described herein.

RF transceiver 502 may also be configured to perform transmission of radio frequency signals, such as e.g. by receiving baseband signals intended for uplink transmission from other components of UE 102, modulating the received baseband signals onto a radio carrier frequency, and wirelessly transmitting the resulting radio frequency radio signals using antenna 500. UE 102 may exchange data with one or more cells, such as e.g. cells located at base stations 104-108 in this manner.

For example, RF transceiver 502 may be configured to perform uplink transmissions, such as e.g. from mobile terminal 102 to base station 104, using a HARQ transmission scheme. Accordingly, HARQ buffer 504 may provide RF transceiver 502 with uplink data, such as e.g. a MAC PDU, and RF transceiver 502 may then transmit the uplink data provided by HARQ buffer 504 according to the HARQ transmission scheme.

HARQ control circuit 506 may control RF transceiver 502 in order to perform transmission according to the HARQ transmission scheme. For example, HARQ control circuit 506 may instruct RF transceiver 502 to transmit uplink data from HARQ buffer 504 according to the appropriate HARQ transmission/retransmission grant occasions.

For example, RF transceiver 502 may first receive and demodulate an initial uplink grant, e.g. received by antenna 500 from base station 104, and may provide the uplink grant to HARQ control circuit 506. HARQ control circuit 506 may then process the uplink grant, such as e.g. to determine the uplink data corresponding to the grant, and may provide control to HARQ buffer 504. HARQ buffer 504 may then buffer the appropriate uplink data, and subsequently provide the uplink data to RF transceiver 504.

HARQ control circuit 506 may then instruct RF transceiver 502 to transmit the uplink data provided by HARQ buffer 504 according to the uplink grant. RF transceiver 502 may then transmit the uplink data, thereby properly responding to the uplink grant.

As previously detailed, a HARQ transmission scheme may involve the reception of HARQ feedback from the HARQ sink (e.g. base station 104), and accordingly base station 104 may transmit either an ACK or a NACK back to UE 102 based on a successful or unsuccessful reception of the transmitted uplink data. HARQ control circuit 506 may thus identify the next retransmission grant occasion according to the HARQ transmission scheme, and may control RF transceiver 502 to receive the HARQ feedback accordingly. RF transceiver 502 may then receive and demodulate the HARQ feedback using antenna 500, and provide the HARQ feedback to HARQ control circuit 506. HARQ control circuit 506 may then process the received HARQ feedback, and control RF transceiver 502 and HARQ buffer 504 according to the HARQ feedback.

For example, if the received HARQ feedback is a NACK, HARQ control circuit 506 may instruct HARQ buffer 504 and RF transceiver 502 to retransmit the data stored in HARQ buffer 504. Alternatively, if the received HARQ feedback is an ACK, HARQ control circuit 506 may control HARQ buffer 504 and RF transceiver 502 to not perform a retransmission of the uplink data stored in HARQ buffer 504.

HARQ control circuit 506 may also be configured to control RF transceiver 502 and HARQ buffer 504 according to the maximum number of HARQ transmission occasions defined by the parameter maxHARQ_tx and a selected parameter k in correspondence with the above-detailed processes. For example, HARQ control circuit 506 may be configured to determine the value of maxHARQ_tx, either by receiving the parameter via RRC signaling received by RF transceiver 502 or by setting maxHARQ_tx to the default value of maxHARQ_tx=5 in the event that no maxHARQ_tx value is received from the network.

HARQ control circuit 506 may thus be configured to control RF transceiver 502 and HARQ buffer 504 according to process 300 of FIG. 3. For example, HARQ control circuit 506 may be configured to monitor each HARQ feedback received from base station 104 for ACK or non-NACK feedback. Depending on the current setting of k, HARQ control circuit 506 may be configured to determine whether or not to continue performing retransmission of the uplink data stored in HARQ buffer 504 following the reception of one or more non-NACK feedback messages from base station 104. For example, if k is set to k=0, HARQ control circuit 506 may be configured to control RF transceiver 502 and HARQ buffer 504 to stop sending retransmissions following reception of a first ACK from base station 104. Alternatively, if k is set a value greater than zero, HARQ control circuit 506 may be configured to monitor the number of consecutively received non-NACK messages (e.g. as done in HARQ feedback evaluation loop 312 of process 300) in order to determine if retransmissions should be terminated, i.e. if any remaining retransmission grant occasions defined by maxHARQ_tx should be skipped.

If HARQ control circuit 506 determines that the appropriate number of consecutive non-NACK messages have been received (i.e. according to the setting of k), and that there are remaining HARQ retransmission occasions in the current HARQ cycle (i.e. corresponding to block 316 of process 300), HARQ control circuit 506 may activate a power saving mode, e.g. power/clock gating of temporarily not required modem subcomponents, for one or more components of UE 102. For example, cellular protocol stack elements, e.g. in RF transceiver 502 or other components of UE 102 (not explicitly shown) may be instructed by HARQ control circuit 506 to enter power saving mode. UE 102 may thus conserve battery power by skipping any retransmission grant occasions remaining in the current HARQ cycle.

HARQ control circuit 506 may additionally be configured to perform adaptations of k, e.g. as in block 306 of process 300, in accordance with the approaches for adapting k detailed above. For example, HARQ control circuit 506 may be configured to monitor the number of ACK, NACK, and non-feedback periods received in order to determine an error rate, e.g. by monitoring HARQ feedback messages received from RF transceiver 502. Alternatively, HARQ control circuit 506 may be configured to monitor radio conditions such as e.g. CQI. Another component of UE 102, such as e.g. RF transceiver 502 or an additional component configured to perform and/or manage CQI measurements, may provide HARQ control circuit 506 with the CQI measurements. HARQ control circuit 506 may then process the CQI measurements and select an appropriate value of k accordingly, such as by utilizing a hysteresis curve such as e.g. hysteresis curve 400. It is understood that HARQ control circuit 506 may be configured to perform such adaptations of k corresponding to any of the above detailed criteria, such as e.g. radio link conditions, packet loss rate, past battery usage, and/or remaining battery power.

Figure 6:
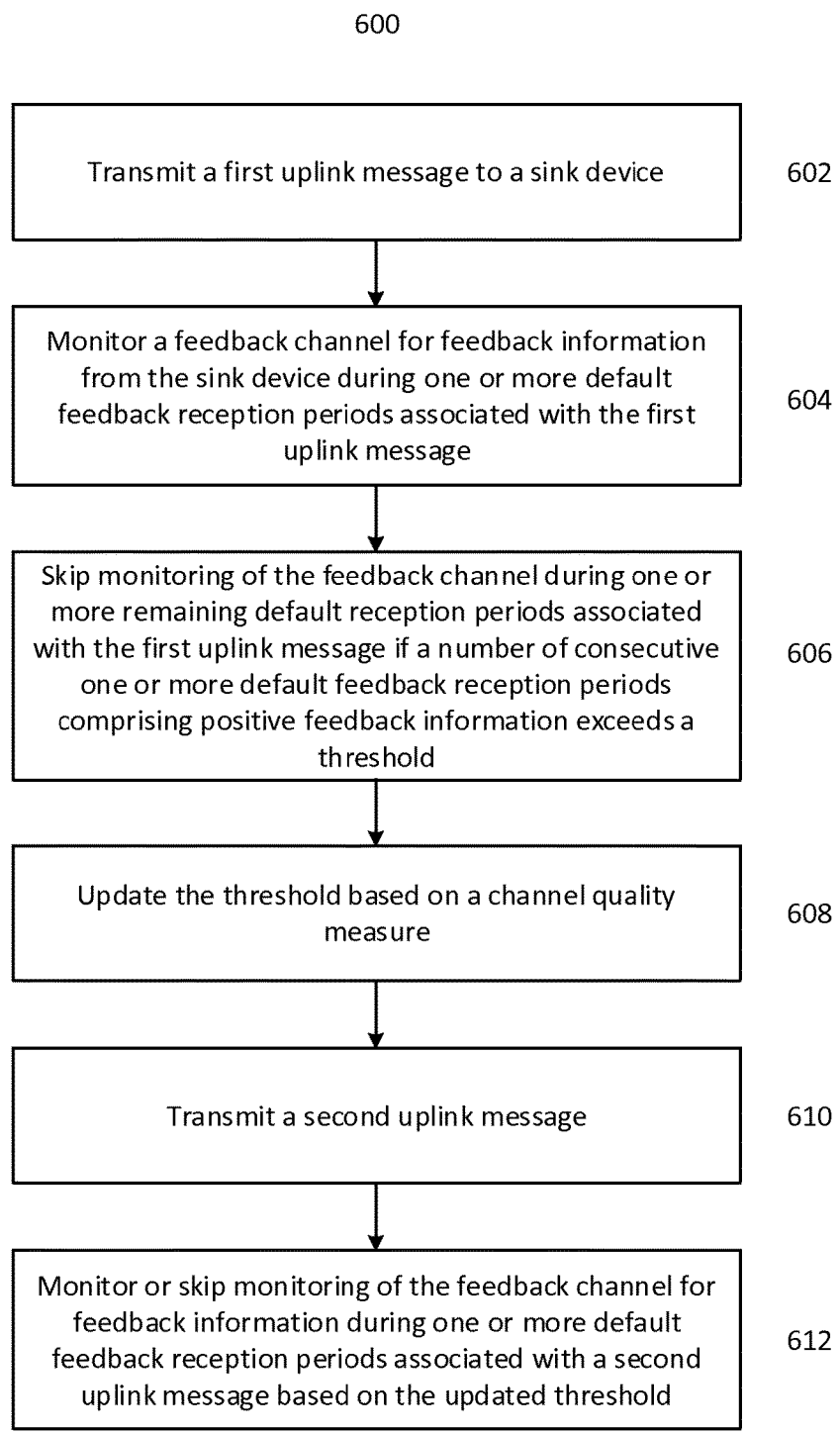
FIG. 6 shows a flow diagram illustrating a method for transmitting a plurality of uplink messages according to an exemplary aspect of the disclosure.

FIG. 6 shows method 600 for transmitting a plurality of uplink messages according to an exemplary aspect of the disclosure. Method 600 may transmit a first uplink message to a sink device in 602. Method 600 may then monitor a feedback channel for feedback information from the sink device during one or more default feedback reception periods associated with the first uplink message in 604. In 606, method 600 may skip monitoring of the feedback channel during the remaining default feedback reception periods associated with the first uplink message if a number of consecutive default feedback reception periods containing positive feedback information exceeds a threshold (e.g. if in the HARQ feedback evaluation loop 312 of process 300 Count becomes greater than k). Method 600 may then update the threshold based on a channel quality measure in 608. Method 600 may then transmit a second uplink message in 610. In 612, method 600 may monitor or skip monitoring of the feedback channel during default feedback reception periods associated with a second uplink message based on the updated threshold.

Figure 7:
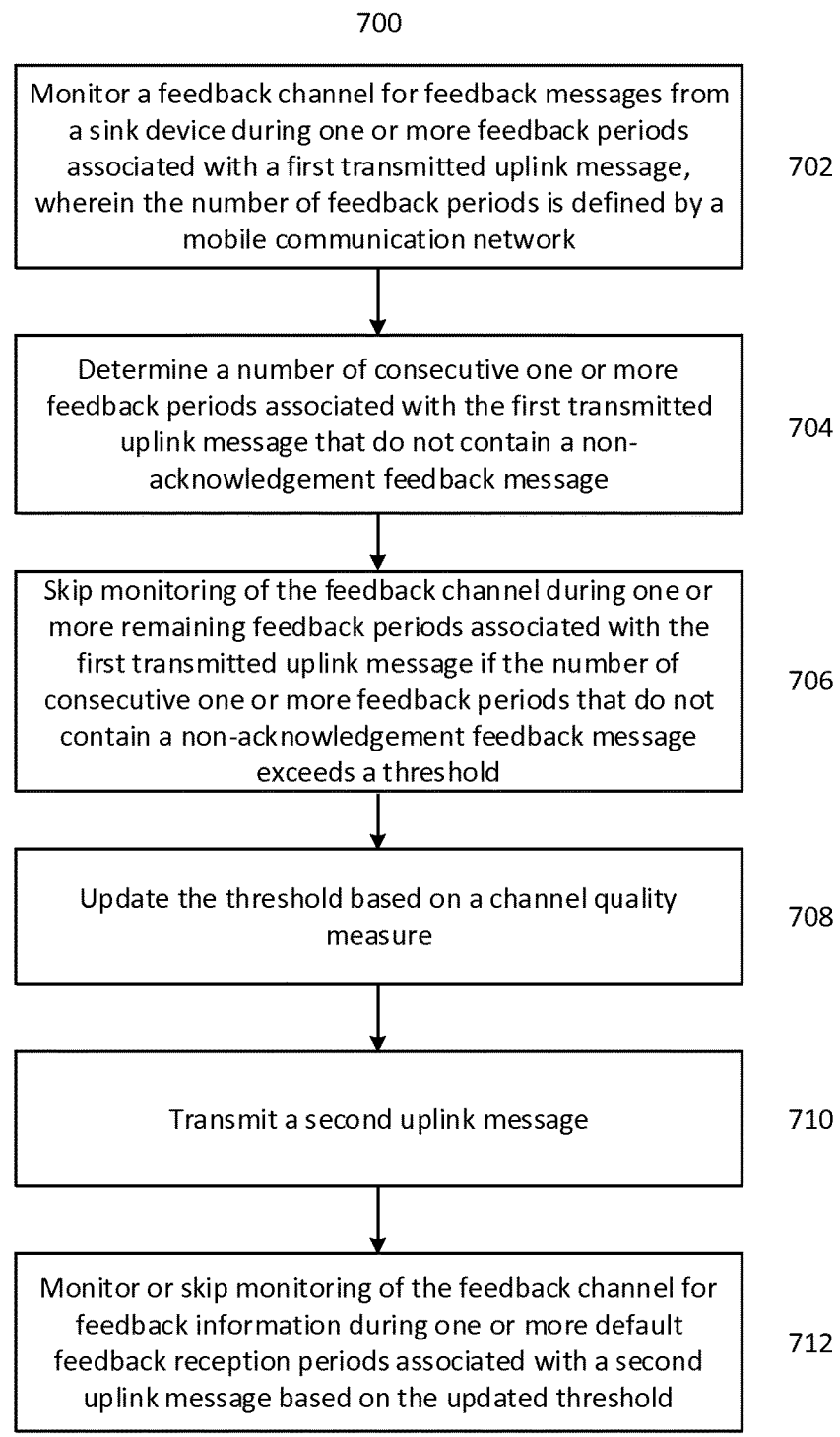
FIG. 7 shows a flow diagram illustrating a method for transmitting a plurality of uplink messages according to another exemplary aspect of the disclosure.

FIG. 7 shows method 700 for transmitting a plurality of uplink messages according to another exemplary aspect of the disclosure. In 702, method 700 may monitor a feedback channel for feedback messages from a sink device during one or more feedback periods associated with a first transmitted uplink message, wherein the number of feedback periods is defined by a mobile communication network. Method 700 may then determine a number of consecutive feedback periods associated with the first transmitted uplink message that do not contain a non-acknowledgement feedback message in 704. Method 700 may then skip monitoring of the feedback channel during the remaining feedback periods associated with the first transmitted uplink message if the number of consecutive feedback periods not containing a non-acknowledgement feedback message exceeds a threshold in 706. In 708, method 700 may update the threshold based on a channel quality measure. Method 700 may then transmit a second uplink message in 710, and may monitor or skip monitoring of the feedback channel during default feedback reception periods associated with a second uplink message based on the updated threshold in 712.

Referring to FIG. 5, UE 102 may include a transceiver (RF transceiver 502) and a control circuit (HARQ control circuit 506). The transceiver may be configured to transmit a first uplink message to a sink device, monitor a feedback channel for feedback information from the sink device during one or more default feedback reception periods associated with the first uplink message, and transmit a second uplink message. The control circuit may be configured to control the transceiver to skip monitoring of the feedback channel during the remaining default feedback reception periods associated with the first uplink message if a number of consecutive default feedback reception periods containing positive feedback information exceeds a threshold, update the threshold based on a channel quality measure, and control the transceiver to monitor or skip monitoring of the feedback channel during default feedback reception periods associated with the second uplink message based on the updated threshold.

The following examples pertain to further aspects of this disclosure:

Example 1 is a method for transmitting a plurality of uplink messages. The method includes transmitting a first uplink message to a sink device; monitoring a feedback channel for feedback information from the sink device during one or more default feedback reception periods associated with the first uplink message; and skipping monitoring of the feedback channel during the remaining default reception periods associated with the first uplink message if a number of consecutive default feedback reception periods containing positive feedback information exceeds a threshold. The method further includes updating the threshold based on a channel quality measure; transmitting a second uplink message; and monitoring or skipping monitoring of the feedback channel during default feedback reception periods associated with a second uplink message based on the updated threshold.

In Example 2, the subject matter of Example 1 can optionally include wherein the positive feedback information is either an acknowledgement message or no feedback message.

In Example 3, the subject matter of Example 2 can optionally include wherein the skipping monitoring of the feedback channel during the remaining default reception periods associated with the first uplink message includes skipping monitoring of the feedback channel during the remaining default reception periods associated with the first uplink message if the first default feedback reception period of the consecutive default feedback reception periods containing positive feedback information is an acknowledgement message.

In Example 4, the subject matter of Example 1 can optionally include entering a power saving mode during the remaining default reception periods associated with the first uplink message if a number of consecutive default feedback reception periods containing positive feedback information exceeds the threshold.

In Example 5, the subject matter of Example 1 can optionally include determining if a non-acknowledgement message is received over the feedback channel during one of the default reception periods associated with the first uplink message; and retransmitting the first uplink message to the sink device in response to the received non-acknowledgement message.

In Example 6, the subject matter of Examples 1 to 5 can optionally include wherein the one or more default feedback reception periods associated with the first uplink message occur according a schedule with a fixed period.

In Example 7, the subject matter of Example 6 can optionally include wherein the sink device is configured to transmit a feedback message during each default feedback reception period associated with the first uplink message.

In Example 8, the subject matter of Example 7 can optionally include wherein each feedback message indicates whether the first uplink message was successfully received by the sink device.

In Example 9, the subject matter of Example 7 can optionally include determining if a non-acknowledgement message is received over the feedback channel during any of the one or more default feedback reception periods associated with the first uplink message; and retransmitting the first uplink message to the sink device in response to each received non-acknowledgement message.

In Example 10, the subject matter of Example 1 can optionally include wherein the transmitting a first uplink message to a sink device includes transmitting the first uplink message to the sink device using an uplink Hybrid Automatic Request (HARQ) transmission protocol.

In Example 11, the subject matter of Example 10 can optionally include retransmitting the first uplink message to the sink device as an uplink HARQ retransmission upon receiving a non-acknowledgement message from the sink device.

In Example 12, the subject matter of Example 10 or 11 can optionally include wherein the default feedback reception periods associated with the first uplink message are uplink HARQ retransmission grant occasions.

In Example 13, the subject matter of Example 12 can optionally include wherein the default feedback reception periods associated with the first uplink message are scheduled according to an uplink HARQ retransmission grant occasion schedule.

In Example 14, the subject matter of Example 13 can optionally include wherein the default feedback reception periods associated with the first uplink message occur are separated by 8 ms intervals.

In Example 15, the subject matter of Example 1 can optionally include wherein the number of default feedback reception periods associated with the first uplink message is based on a network-defined parameter.

In Example 16, the subject matter of Example 15 can optionally include receiving the network-defined parameter from the sink device.

In Example 17, the subject matter of Example 15 or 16 can optionally include wherein the transmitting a first uplink message to a sink device includes transmitting the first uplink message to the sink device using an uplink Hybrid Automatic Request (HARQ) transmission protocol, and wherein the network-defined parameter is maxHARQ_tx.

In Example 18, the subject matter of Example 17 can optionally include wherein the threshold is an integer value greater than zero and less than maxHARQ_tx.

In Example 19, the subject matter of Example 15 can optionally include wherein the network-defined parameter determines the maximum number of times that the first uplink message can be retransmitted.

In Example 20, the subject matter of Example 1 can optionally include wherein the threshold is 1, and wherein the skipping monitoring of the feedback channel during the remaining default reception periods associated with the first uplink message includes skipping monitoring of the feedback channel during all remaining default reception periods associated with the first uplink message after a first acknowledgement message is received from the sink device.

In Example 21, the subject matter of Example 1 can optionally include wherein the updating the threshold includes measuring a signal-to-interference-plus-noise ratio; determining a channel quality measure based on the signal-to-interference-plus-noise-ratio; and selecting a new threshold as the updated threshold based on the determined channel quality measure.

In Example 22, the subject matter of Example 21 can optionally include wherein the selecting a new threshold as the updated threshold based on the determined channel quality measure includes utilizing a mapping function to select the new threshold from a plurality of thresholds based on the determined channel quality measure.

In Example 23, the subject matter of Example 21 can optionally include wherein the selecting a new threshold as the updated threshold based on the determined channel quality measure includes selecting the new threshold based on the determined channel quality measure based on a hysteresis curve.

In Example 24, the subject matter of Example 21 can optionally include wherein the selecting a new threshold as the updated threshold based on the determined channel quality measure includes identifying a plurality of previously determined channel quality measures; calculating a moving average channel quality measure based on the plurality of previously determined channel quality measure; and selecting the new threshold as the updated threshold based on the moving average channel quality measure.

In Example 25, the subject matter of Example 24 can optionally include wherein the selecting a new threshold as the updated threshold based on the moving average channel quality measure includes rounding the moving average channel quality measure to the nearest integer value to obtain an integer channel quality measure; and selecting the new threshold by utilizing a mapping function to select the new threshold from a plurality of thresholds based on the integer channel quality measure.

In Example 26, the subject matter of Example 21 can optionally include wherein the selecting a new threshold as the updated threshold based on the determined channel quality measure includes exponentially smoothing the determined channel quality measure with one or more previously determined channel quality measures to obtain a smoothed channel quality measure; and selecting the new threshold by utilizing a mapping function to select the new threshold from a plurality of thresholds based on the smoothed channel quality measure.

In Example 27, the subject matter of Example 1 can optionally include wherein the selecting a new threshold as the updated threshold based on the determined channel quality measure includes selecting a lower threshold as the updated threshold if the determined channel quality measure is less than a channel quality measure threshold.

In Example 28, the subject matter of Example 21 can optionally include wherein the selecting a new threshold as the updated threshold based on the determined channel quality measure includes selecting a higher threshold as the updated threshold if the determined channel quality measure is higher than a channel quality measure threshold.

In Example 29, the subject matter of Examples 21 to 28 can optionally include wherein the determined channel quality measure is a Channel Quality Indicator.

In Example 30, the subject matter of Example 1 can optionally include determining the channel quality measure based on previously received non-acknowledgement messages received from the sink device.

In Example 31, the subject matter of Example 30 can optionally include wherein the determining the channel quality measure based on previously received non-acknowledgement messages received from the sink device includes determining a number of non-acknowledgement messages previously received from the sink device.

In Example 32, the subject matter of Example 30 can optionally include wherein the channel quality measure is a retransmission request rate.

In Example 33, the subject matter of Example 30 can optionally include wherein the updating the threshold based on the determined channel quality measure includes selecting a lower threshold as the threshold if the channel quality measure is less than a channel quality measure threshold.

In Example 34, the subject matter of Example 30 can optionally include wherein the updating the threshold based on the determined channel quality measure includes selecting a higher threshold as the threshold if the channel quality measure is higher than a channel quality measure threshold.

In Example 35, the subject matter of Example 1 can optionally include storing the first uplink message in a transmission buffer.

In Example 36, the subject matter of Example 35 can optionally include deleting the first uplink message from the transmission buffer if the number of consecutive default feedback reception periods associated with the first uplink message containing positive feedback information exceeds the threshold.

In Example 37, the subject matter of Example 36 can optionally include deleting the first uplink message from the transmission buffer if the one or more default feedback reception periods associated with the first uplink message are completed.

In Example 38, the subject matter of Example 36 or 37 can optionally include storing the second uplink message in the transmission buffer after deleting the first uplink message from the transmission buffer.

In Example 39, the subject matter of Example 1 can optionally include monitoring the feedback channel for feedback information from the sink device during one or more of the default feedback reception periods associated with the second uplink message; and wherein the monitoring or skipping monitoring of the feedback channel during default feedback reception periods associated with the second uplink message includes skipping monitoring of the feedback channel during the remaining default reception periods associated with the second uplink message if a number of consecutive default feedback reception periods containing positive feedback information exceeds the threshold.

In Example 40, the subject matter of Example 39 can optionally include updating the threshold based on a further determined channel quality measure; transmitting a third uplink message; and monitoring or skipping monitoring of the feedback channel during default feedback reception periods associated with the third uplink message based on the updated threshold.

In Example 41, the subject matter of Example 1 to 40 can optionally include wherein the sink device is a base station.

Example 42 is a mobile radio communication terminal device. The mobile radio communication terminal device includes a transceiver and a control circuit. The transceiver is configured to transmit a first uplink message to a sink device, monitor a feedback channel for feedback information from the sink device during one or more default feedback reception periods associated with the first uplink message, and transmit a second uplink message. The control circuit is configured to control the transceiver to skip monitoring of the feedback channel during the remaining default reception periods associated with the first uplink message if a number of consecutive default feedback reception periods containing positive feedback information exceeds a threshold, update the threshold based on a channel quality measure, and control the transceiver to monitor or skip monitoring of the feedback channel during default feedback reception periods associated with the second uplink message based on the updated threshold.

In Example 43, the subject matter of Example 42 can optionally include wherein the positive feedback information is either an acknowledgement message or no feedback message.

In Example 44, the subject matter of Example 43 can optionally include wherein the control circuit is configured to control the transceiver to skip monitoring of the feedback channel during the remaining default reception periods associated with the first uplink message if the first default feedback reception period of the consecutive default feedback reception periods containing positive feedback information is an acknowledgement message.

In Example 45, the subject matter of Example 42 can optionally include wherein the mobile radio communication terminal device is configured to enter a power saving mode during the remaining default reception periods associated with the first uplink message if a number of consecutive default feedback reception periods containing positive feedback information exceeds the threshold.

In Example 46, the subject matter of Example 42 can optionally include wherein the control circuit further configured to determine if a non-acknowledgement message is received over the feedback channel during one of the default reception periods associated with the first uplink message; and control the transceiver to retransmit the first uplink message to the sink device in response to the received non-acknowledgement message.

In Example 47, the subject matter of Examples 42 to 46 can optionally include wherein the one or more default feedback reception periods associated with the first uplink message occur according a schedule with a fixed period.

In Example 48, the subject matter of Example 47 can optionally include wherein the sink device is configured to transmit a feedback message during each default feedback reception period associated with the first uplink message.

In Example 49, the subject matter of Example 48 can optionally include wherein each feedback message indicates whether the first uplink message was successfully received by the sink device.

In Example 50, the subject matter of Example 48 can optionally include wherein the control circuit further is configured to determine if a non-acknowledgement message is received over the feedback channel during any of the one or more default feedback reception periods associated with the first uplink message; and control the transceiver to retransmit the first uplink message to the sink device in response to each received non-acknowledgement message.

In Example 51, the subject matter of Example 42 can optionally include wherein the transceiver is configured to transmit the first uplink message using an uplink Hybrid Automatic Request (HARQ) transmission protocol.

In Example 52, the subject matter of Example 51 can optionally include wherein the control circuit is further configured to control the transceiver to retransmit the first uplink message to the sink device as an uplink HARQ retransmission upon receiving a non-acknowledgement message from the sink device.

In Example 53, the subject matter of Example 51, wherein the default feedback reception periods associated with the first uplink message are uplink HARQ retransmission grant occasions.

In Example 54, the subject matter of Example 53 can optionally include wherein the default feedback reception periods associated with the first uplink message are scheduled according to an uplink HARQ retransmission grant occasion schedule.

In Example 55, the subject matter of Example 54 can optionally include wherein the default feedback reception periods associated with the first uplink message occur are separated by 8 ms intervals.

In Example 56, the subject matter of Example 42 can optionally include wherein the number of default feedback reception periods associated with the first uplink message is based on a network-defined parameter.

In Example 57, the subject matter of Example 56 can optionally include wherein the transceiver is further configured to receive the network-defined parameter from the sink device.

In Example 58, the subject matter of Example 56 or 57 can optionally include wherein the transceiver is further configured to transmit the first uplink message to the sink device using an uplink Hybrid Automatic Request (HARQ) transmission protocol, and wherein the network-defined parameter is maxHARQ_tx.

In Example 59, the subject matter of Example 58 can optionally include wherein the threshold is an integer value greater than zero and less than maxHARQ_tx.

In Example 60, the subject matter of Example 56 can optionally include wherein the network-defined parameter determines the maximum number of times that the first uplink message can be retransmitted.

In Example 61, the subject matter of Example 42 can optionally include wherein the threshold is 1, and wherein the control circuit is configured to control the transceiver to skip monitoring of the feedback channel during all remaining default reception periods associated with the first uplink message after a first acknowledgement message is received.

In Example 62, the subject matter of Example 42 can optionally include wherein the control circuit is configured to update the threshold based on a channel quality measure by measuring a signal-to-interference-plus-noise ratio determining a channel quality measure based on the signal-to-interference-plus-noise ratio; and selecting a new threshold as the updated threshold based on the determined channel quality measure.

In Example 63, the subject matter of Example 62 can optionally include wherein the control circuit is configured to select a new threshold as the updated threshold based on the determined channel quality measure by utilizing a mapping function to select the new threshold from a plurality of thresholds based on the determined channel quality measure.

In Example 64, the subject matter of Example 62 can optionally include wherein the control circuit is configured to select a new threshold as the updated threshold based on the determined channel quality measure by selecting the new threshold based on the determined channel quality measure based on a hysteresis curve.

In Example 65, the subject matter of Example 62 can optionally include wherein the control circuit is configured to select a new threshold as the updated threshold based on the determined channel quality measure by identifying a plurality of previously determined channel quality measures; calculating a moving average channel quality measure based on the plurality of previously determined channel quality measures; and selecting the new threshold as the updated threshold based on the moving average channel quality measure.

In Example 66, the subject matter of Example 65 can optionally include wherein the control circuit is configured to select the new threshold as the updated threshold based on the moving average channel quality measure by rounding the moving average channel quality measure to the nearest integer value to obtain an integer channel quality measure; and selecting the new threshold by utilizing a mapping function to select the new threshold from a plurality of thresholds based on the integer channel quality measure.

In Example 67, the subject matter of Example 62 can optionally include wherein the control circuit is configured to select a new threshold as the updated threshold based on the determined channel quality measure by exponentially smoothing the determined channel quality measure with one or more previously determined channel quality measures to obtain a smoothed channel quality measure; and selecting the new threshold by utilizing a mapping function to select the new threshold from a plurality of thresholds based on the smoothed channel quality measure.

In Example 68, the subject matter of Example 62 can optionally include wherein the control circuit is configured to select a new threshold as the updated threshold based on the determined channel quality measure by selecting a lower threshold as the updated threshold if the determined channel quality measure is less than a channel quality measure threshold.

In Example 69, the subject matter of Example 62 can optionally include wherein the control circuit is configured to select a new threshold as the updated threshold based on the determined channel quality measure by selecting a higher threshold as the updated threshold if the determined channel quality measure is higher than a channel quality measure threshold.

In Example 70, the subject matter of Examples 62 to 69 can optionally include wherein the determined channel quality measure is a Channel Quality Indicator.

In Example 71, the subject matter of Example 42 can optionally include wherein the control circuit is configured to update the threshold based on a channel quality measure by determining the channel quality measure based on previously received non-acknowledgement messages received from the sink device.

In Example 72, the subject matter of Example 71 can optionally include wherein the control circuit is configured to determine the channel quality measure based on previously received non-acknowledgement messages received from the sink device by determining a number of non-acknowledgement messages previously received from the sink device.

In Example 73, the subject matter of Example 71 can optionally include wherein the channel quality measure is a retransmission request rate.

In Example 74, the subject matter of Example 71 can optionally include wherein the control circuit is configured to update the threshold based on a channel quality measure by selecting a lower threshold as the threshold if the channel quality measure is less than a channel quality measure threshold.

In Example 75, the subject matter of Example 71 can optionally include wherein the control circuit is configured to update the threshold based on a channel quality measure by selecting a higher threshold as the threshold if the channel quality measure is higher than a channel quality measure threshold.

In Example 76, the subject matter of Example 42 can optionally include a transmission buffer.

In Example 77, the subject matter of Example 76 can optionally include wherein the transmission buffer is configured to store the first uplink message.

In Example 78, the subject matter of Example 77 can optionally include wherein the transmission buffer is configured to delete the first uplink message if the number of consecutive default feedback reception periods associated with the first uplink message containing positive feedback information exceeds the threshold.

In Example 79, the subject matter of Example 78 can optionally include wherein the transmission buffer is configured to delete the first uplink message if the one or more default feedback reception periods associated with the first uplink message are completed.

In Example 80, the subject matter of Example 78 or 79 can optionally include wherein the transmission buffer is further configured to store the second uplink message in the transmission buffer after deleting the first uplink message from the transmission buffer.

In Example 81, the subject matter of Example 42 can optionally include wherein the transceiver is further configured to monitor the feedback channel for feedback information from the sink device during one or more of the default feedback reception periods associated with the second uplink message; and wherein the control circuit is further configured to control the transceiver to skip monitoring of the feedback channel during the remaining default reception periods associated with the second uplink message if a number of consecutive default feedback reception periods containing positive feedback information exceeds the threshold In Example 82, the subject matter of Example 81 can optionally include wherein the transceiver is further configured to transmit a third uplink message, and wherein the control circuit further configured to update the threshold based on a further channel quality measure; and control the transceiver to monitor or skip monitoring of the feedback channel during default feedback reception periods associated with the third uplink message based on the updated threshold.

In Example 83, the subject matter of Example 42 to 82 can optionally include wherein the sink device is a base station.

Example 84 is a method for transmitting a plurality of uplink messages. The method includes monitoring a feedback channel for feedback messages from a sink device during one or more feedback periods associated with a first transmitted uplink message, wherein the number of feedback periods is defined by a mobile communication network; determining a number of consecutive feedback periods associated with the first transmitted uplink message that do not contain a non-acknowledgement feedback message; skipping monitoring of the feedback channel during the remaining feedback periods associated with the first transmitted uplink message if the number of consecutive feedback periods exceeds a threshold; updating the threshold based on a channel quality measure; transmitting a second uplink message to the sink device; and monitoring or skipping monitoring of the feedback channel during feedback reception periods associated with a second uplink message based on the updated threshold.

In Example 85, the subject matter of Example 84 can optionally include wherein the determining a number of consecutive feedback periods associated with the first transmitted uplink message that do not contain a non-acknowledgement feedback message includes determining a number of consecutive feedback periods associated with the first transmitted uplink message that contain an acknowledgement feedback message or contain no feedback message.

In Example 86, the subject matter of Example 85 can optionally include wherein the skipping monitoring of the feedback channel during the remaining reception periods associated with the first transmitted uplink message includes skipping monitoring of the feedback channel during the remaining reception periods associated with the first transmitted uplink message if the first feedback reception period of the consecutive feedback reception periods that does not contain a non-acknowledgement feedback message contains an acknowledgement message.

In Example 87, the subject matter of Example 84 can optionally include entering a power saving mode during the remaining reception periods associated with the first transmitted uplink message if the number of consecutive feedback reception periods exceeds the threshold.

In Example 88, the subject matter of Example 87 can optionally include determining if a non-acknowledgement message is received over the feedback channel during one of the reception periods associated with the first transmitted uplink message; and retransmitting the first transmitted uplink message to the sink device in response to the received non-acknowledgement message.

In Example 89, the subject matter of Examples 84 to 88 can optionally include wherein the one or more feedback reception periods associated with the first transmitted uplink message occur according a schedule with a fixed period.

In Example 90, the subject matter of Example 89 can optionally include wherein the sink device is configured to transmit a feedback message during each feedback reception period associated with the first transmitted uplink message.

In Example 91, the subject matter of Example 90 can optionally include wherein each feedback message indicates whether the first transmitted uplink message was successfully received by the sink device.

In Example 92, the subject matter of Example 90 can optionally include determining if a non-acknowledgement message is received over the feedback channel during any of the one or more feedback reception periods associated with the first transmitted uplink message; and retransmitting the first transmitted uplink message to the sink device in response to each received non-acknowledgement message.

In Example 93, the subject matter of Example 84 can optionally include transmitting the first transmitted uplink message to the sink device using an uplink Hybrid Automatic Request (HARQ) transmission protocol.

In Example 94, the subject matter of Example 93 can optionally include retransmitting the first transmitted uplink message to the sink device as an uplink HARQ retransmission upon receiving a non-acknowledgement message from the sink device.

In Example 95, the subject matter of Example 93 or 94 can optionally include wherein the feedback reception periods associated with the first transmitted uplink message are uplink HARQ retransmission grant occasions.

In Example 96, the subject matter of Example 95 can optionally include wherein the feedback reception periods associated with the first transmitted uplink message are scheduled according to an uplink HARQ retransmission grant occasion schedule.

In Example 97, the subject matter of Example 96 can optionally include wherein the feedback reception periods associated with the first transmitted uplink message occur are separated by 8 ms intervals.

In Example 98, the subject matter of Example 84 can optionally include wherein the number of feedback reception periods associated with the first transmitted uplink message is based on a network-defined parameter.

In Example 99, the subject matter of Example 98 can optionally include receiving the network-defined parameter from the sink device.

In Example 100, the subject matter of Example 98 or 99 can optionally include transmitting the first uplink message to the sink device using an uplink Hybrid Automatic Request (HARQ) transmission protocol, and wherein the network-defined parameter is maxHARQ_tx.

In Example 101, the subject matter of Example 100 can optionally include wherein the threshold is an integer value greater than zero and less than maxHARQ_tx.

In Example 102, the subject matter of Example 98 can optionally include wherein the network-defined parameter determines the maximum number of times that the first transmitted uplink message can be retransmitted.

In Example 103, the subject matter of Example 84 can optionally include wherein the threshold is 1, and wherein the skipping monitoring of the feedback channel during the remaining reception periods associated with the first transmitted uplink message includes skipping monitoring of the feedback channel during all remaining reception periods associated with the first transmitted uplink message after a first acknowledgement message is received from the sink device.

In Example 104, the subject matter of Example 84 can optionally include wherein the updating the threshold includes measuring a signal-to-interference-plus-noise ratio; determining a channel quality measure based on the signal-to-interference-plus-noise-ratio; and selecting a new threshold as the updated threshold based on the determined channel quality measure.

In Example 105, the subject matter of Example 104 can optionally include wherein the selecting a new threshold as the updated threshold based on the determined channel quality measure includes utilizing a mapping function to select the new threshold from a plurality of thresholds based on the determined channel quality measure.

In Example 106, the subject matter of Example 104 can optionally include wherein the selecting a new threshold as the updated threshold based on the determined channel quality measure includes selecting the new threshold based on the determined channel quality measure based on a hysteresis curve.

In Example 107, the subject matter of Example 104 can optionally include wherein the selecting a new threshold as the updated threshold based on the determined channel quality measure includes identifying a plurality of previously determined channel quality measures; calculating a moving average channel quality measure based on the plurality of previously determined channel quality measure; and selecting the new threshold as the updated threshold based on the moving average channel quality measure.

In Example 108, the subject matter of Example 107 can optionally include wherein the selecting a new threshold as the updated threshold based on the moving average channel quality measure includes rounding the moving average channel quality measure to the nearest integer value to obtain an integer channel quality measure; and selecting the new threshold by utilizing a mapping function to select the new threshold from a plurality of thresholds based on the integer channel quality measure.

In Example 109, the subject matter of Example 104 can optionally include wherein the selecting a new threshold as the updated threshold based on the determined channel quality measure includes exponentially smoothing the determined channel quality measure with one or more previously determined channel quality measures to obtain a smoothed channel quality measure; and selecting the new threshold by utilizing a mapping function to select the new threshold from a plurality of thresholds based on the smoothed channel quality measure.

In Example 110, the subject matter of Example 104 can optionally include wherein the selecting a new threshold as the updated threshold based on the determined channel quality measure includes selecting a lower threshold as the updated threshold if the determined channel quality measure is less than a channel quality measure threshold.

In Example 111, the subject matter of Example 104 can optionally include wherein the selecting a new threshold as the updated threshold based on the determined channel quality measure includes selecting a higher threshold as the updated threshold if the determined channel quality measure is higher than a channel quality measure threshold.

In Example 112, the subject matter of Examples 104 to 111 can optionally include wherein the determined channel quality measure is a Channel Quality Indicator.

In Example 113, the subject matter of Example 84 can optionally include determining the channel quality measure based on previously received non-acknowledgement messages received from the sink device.

In Example 114, the subject matter of Example 113 can optionally include wherein the determining the channel quality measure based on previously received non-acknowledgement messages received from the sink device includes determining a number of non-acknowledgement messages previously received from the sink device.

In Example 115, the subject matter of Example 113 can optionally include wherein the channel quality measure is a retransmission request rate.

In Example 116, the subject matter of Example 113 can optionally include wherein the updating the threshold based on the determined channel quality measure includes selecting a lower threshold as the threshold if the channel quality measure is less than a channel quality measure threshold.

In Example 117, the subject matter of Example 113 can optionally include wherein the updating the threshold based on the determined channel quality measure includes selecting a higher threshold as the threshold if the channel quality measure is higher than a channel quality measure threshold.

In Example 118, the subject matter of Example 84 can optionally include storing the first transmitted uplink message in a transmission buffer.

In Example 119, the subject matter of Example 118 can optionally include deleting the first transmitted uplink message from the transmission buffer if the number of consecutive default feedback reception periods associated with the first transmitted uplink message that do not contain a non-acknowledgement feedback message exceeds the threshold.

In Example 120, the subject matter of Example 119 can optionally include deleting the first transmitted uplink message from the transmission buffer if the one or more feedback reception periods associated with the first transmitted uplink message are completed.

In Example 121, the subject matter of Example 19 or 120 can optionally include storing the second uplink message in the transmission buffer after deleting the first transmitted uplink message from the transmission buffer.

In Example 122, the subject matter of Example 84 can optionally include monitoring the feedback channel for feedback information from the sink device during one or more of the feedback reception periods associated with the second uplink message; and wherein the monitoring or skipping monitoring of the feedback channel during feedback reception periods associated with the second uplink message includes skipping monitoring of the feedback channel during the remaining reception periods associated with the second uplink message if a number of consecutive feedback periods associated with the first transmitted uplink message that do not contain a non-acknowledgement feedback message exceeds a threshold.

In Example 123, the subject matter of Example 122 can optionally include updating the threshold based on a further channel quality measure; transmitting a third uplink message; and monitoring or skipping monitoring of the feedback channel during feedback reception periods associated with the third uplink message based on the updated threshold.

In Example 124, the subject matter of Examples 84 to 123 can optionally include wherein the sink device is a base station.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for transmitting a plurality of uplink messages comprising:
   transmitting a first uplink message to a sink device;
   monitoring a feedback channel for feedback information from the sink device during one or more default feedback reception periods associated with the first uplink message;
   skipping monitoring of the feedback channel for feedback information during one or more remaining default reception periods associated with the first uplink message if a number of consecutive one or more default feedback reception periods, which comprise positive feedback information, exceeds a threshold;

updating the threshold based on a channel quality measure;

transmitting a second uplink message; and monitoring or skipping monitoring of the feedback channel for feedback information during one or more default feedback reception periods associated with the second uplink message based on the updated threshold.

2. The method of claim 1, wherein the positive feedback information comprises either an acknowledgement message or no feedback message.

3. The method of claim 2, wherein the skipping monitoring of the feedback channel for feedback information during one or more remaining default reception periods associated with the first uplink message comprises:

skipping monitoring of the feedback channel for feedback information the during one or more remaining default reception periods associated with the first uplink message if the first default feedback reception period of the consecutive one or more default feedback reception periods, which comprise positive feedback information, is an acknowledgement message.

4. The method of claim 1, further comprising:

entering a power saving mode during the one or more remaining default reception periods associated with the first uplink message if the number of consecutive one or more default feedback reception periods, which comprise positive feedback information, exceeds the threshold.

5. The method of claim 1, further comprising:

determining if a non-acknowledgement message is received over the feedback channel during one of the one or more default reception periods associated with the first uplink message; and retransmitting the first uplink message to the sink device in response to the received non-acknowledgement message.

6. The method of claim 1, wherein the transmitting a first uplink message to a sink device comprises:

transmitting the first uplink message to the sink device using an uplink Hybrid Automatic Request (HARQ) transmission protocol.

7. The method of claim 1, wherein the updating the threshold comprises:

measuring a signal-to-interference-plus-noise ratio;

determining a channel quality measure based on the signal-to-interference-plus-noise-ratio; and selecting a new threshold as the updated threshold based on the determined channel quality measure.

8. The method of claim 7, wherein the selecting a new threshold as the updated threshold based on the determined channel quality measure comprises:

utilizing a mapping function to select the new threshold from a plurality of thresholds based on the determined channel quality measure.

9. The method of claim 7, wherein the selecting a new threshold as the updated threshold based on the determined channel quality measure comprises:

selecting the new threshold based on the determined channel quality measure based on a hysteresis curve.

10. The method of claim 7, wherein the selecting a new threshold as the updated threshold based on the determined channel quality measure comprises:

identifying a plurality of previously determined channel quality measures;

calculating a moving average channel quality measure based on the plurality of previously determined channel quality measure; and selecting the new threshold as the updated threshold based on the moving average channel quality measure.

11. A mobile radio communication terminal device comprising:

a transceiver configured to:

transmit a first uplink message and a second uplink message to a sink device, and monitor a feedback channel for feedback information from the sink device during one or more default feedback reception periods associated with the first uplink message; and a control circuit configured to:

control the transceiver to skip monitoring of the feedback channel for feedback information during one or more remaining default reception periods associated with the first uplink message if a number of consecutive one or more default feedback reception periods, which comprise positive feedback information, exceeds a threshold, update the threshold based on a channel quality measure, and control the transceiver to monitor or skip monitoring of the feedback channel for feedback information during one or more default feedback reception periods associated with the second uplink message based on the updated threshold.

12. The mobile radio communication terminal device of claim 11, wherein the mobile radio communication terminal device is configured to enter a power saving mode during the one or more remaining default reception periods associated with the first uplink message if the number of consecutive default feedback reception periods, which comprise positive feedback information, exceeds the threshold.

13. The mobile radio communication terminal device of claim 11, wherein the control circuit is configured to update the threshold based on a channel quality measure by:

measuring a signal-to-interference-plus-noise ratio;

determining a channel quality measure based on the signal-to-interference-plus-noise ratio; and selecting a new threshold as the updated threshold based on the determined channel quality measure.

14. The mobile radio communication terminal device of claim 13, wherein the control circuit is configured to select a new threshold as the updated threshold based on the determined channel quality measure by utilizing a mapping function to select the new threshold from a plurality of thresholds based on the determined channel quality measure.

15. The mobile radio communication terminal device of claim 13, wherein the control circuit is configured to select a new threshold as the updated threshold based on the determined channel quality measure by selecting the new threshold based on the determined channel quality measure based on a hysteresis curve.

16. A method for transmitting a plurality of uplink messages comprising:

monitoring a feedback channel for feedback messages from a sink device during one or more feedback periods associated with a first transmitted uplink message, wherein the number of feedback periods is defined by a mobile communication network;

determining a number of consecutive one or more feedback periods associated with the first transmitted uplink message that do not contain a non-acknowledgement feedback message;

skipping monitoring of the feedback channel for feedback messages during one or more remaining feedback periods associated with the first transmitted uplink message if the number of consecutive one or more feedback periods that do not contain a non-acknowledgement feedback message exceeds a threshold;

updating the threshold based on a channel quality measure;

transmitting a second uplink message to the sink device; and monitoring or skipping monitoring of the feedback channel for feedback messages during one or more feedback reception periods associated with a second uplink message based on the updated threshold.

17. The method of claim 16, further comprising:

entering a power saving mode during the one or more remaining reception periods associated with the first transmitted uplink message if the number of consecutive one or more feedback reception periods that do not contain a non-acknowledgement feedback message exceeds the threshold.

18. The method of claim 16, wherein the updating the threshold comprises:

measuring a signal-to-interference-plus-noise ratio;

determining a channel quality measure based on the signal-to-interference-plus-noise-ratio; and selecting a new threshold as the updated threshold based on the determined channel quality measure.

19. The method of claim 18, wherein the selecting a new threshold as the updated threshold based on the determined channel quality measure comprises:

selecting the new threshold based on the determined channel quality measure based on a hysteresis curve.

20. The method of claim 18, wherein the selecting a new threshold as the updated threshold based on the determined channel quality measure comprises:

exponentially smoothing the determined channel quality measure with one or more previously determined channel quality measures to obtain a smoothed channel quality measure; and selecting the new threshold by utilizing a mapping function to select the new threshold from a plurality of thresholds based on the smoothed channel quality measure.

* * * * *